(12) United States Patent
Chenette et al.

(10) Patent No.: US 11,637,851 B2
(45) Date of Patent: *Apr. 25, 2023

(54) CYBER SECURITY POSTURE VALIDATION PLATFORM

(71) Applicant: AttackIQ, Inc., San Diego, CA (US)

(72) Inventors: Stephan Chenette, La Jolla, CA (US); Rajesh Kumar Sharma, San Diego, CA (US)

(73) Assignee: AttackIQ, Inc., San Diego, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 17/024,129

(22) Filed: Sep. 17, 2020

(65) Prior Publication Data

US 2021/0075821 A1    Mar. 11, 2021

Related U.S. Application Data

(63) Continuation of application No. 14/818,975, filed on Aug. 5, 2015, now Pat. No. 10,812,516.

(60) Provisional application No. 62/033,435, filed on Aug. 5, 2014.

(51) Int. Cl.
*H04L 9/40* (2022.01)

(52) U.S. Cl.
CPC .......... *H04L 63/1433* (2013.01); *H04L 63/20* (2013.01)

(58) Field of Classification Search
CPC ..... H04L 63/00; H04L 63/14; H04L 63/1433; H04L 63/1441; H04L 63/16; H04L 63/20; H04L 63/30; H04L 63/302
See application file for complete search history.

(56) References Cited

U.S. PATENT DOCUMENTS

| | | | |
|---|---|---|---|
| 5,455,832 A | 10/1995 | Bowmaster | |
| 6,088,804 A * | 7/2000 | Hill | G06F 21/554 726/25 |
| 6,343,362 B1 | 1/2002 | Ptacek et al. | |
| 7,073,198 B1 | 7/2006 | Flowers et al. | |
| 7,620,985 B1 * | 11/2009 | Bush | H04L 63/1433 726/22 |
| 7,657,789 B1 | 2/2010 | Gerber et al. | |
| 8,359,653 B2 | 1/2013 | Guruswamy | |

(Continued)

FOREIGN PATENT DOCUMENTS

| | | | | |
|---|---|---|---|---|
| CN | 101447991 A | 6/2009 | | |
| EP | 1732004 A1 * | 12/2006 | | G06F 9/505 |
| WO | WO-2013/087982 A1 | 6/2013 | | |

OTHER PUBLICATIONS

International Search Report dated Nov. 18, 2015, for PCT Application No. PCT/US2015/043837, filed on Aug. 5, 2015, 5 pages.

(Continued)

*Primary Examiner* — Eric W Shepperd
(74) *Attorney, Agent, or Firm* — Cooley LLP

(57) ABSTRACT

A cyber security assessment platform is provided. The platform can assess the security posture of a network by deploying one or more scenarios to be executed on one or more assets on the network and analyzing the outcomes of the scenarios. A scenario can be configured to validate a device or network status, and/or mimic an unauthorized cyber-attack. Each scenario can include one or more phases defining an execution path. Related method, apparatus, systems, techniques and articles are also described.

16 Claims, 19 Drawing Sheets

(56) References Cited

U.S. PATENT DOCUMENTS

| | | |
|---|---|---|
| 8,433,811 B2 | 4/2013 | Guruswamy et al. |
| 8,463,860 B1 | 6/2013 | Guruswamy et al. |
| 8,547,974 B1 | 10/2013 | Guruswamy et al. |
| 8,578,482 B1 | 11/2013 | Yang et al. |
| 8,601,587 B1* | 12/2013 | Powell .................. G06F 21/552 726/25 |
| 8,782,796 B2 | 7/2014 | Hawthorn et al. |
| 8,797,800 B1 | 8/2014 | Dong et al. |
| 8,826,084 B1* | 9/2014 | Gauf ................... G06F 11/3684 714/46 |
| 8,826,231 B1 | 9/2014 | Ross et al. |
| 9,032,373 B1 | 5/2015 | Gupta et al. |
| 10,530,799 B1* | 1/2020 | Neil .................... H04L 63/1416 |
| 10,812,516 B2 | 10/2020 | Chenette et al. |
| 2002/0147937 A1 | 10/2002 | Wolf |
| 2003/0005171 A1 | 1/2003 | Schaeffer |
| 2003/0009696 A1 | 1/2003 | Bunker et al. |
| 2003/0051163 A1* | 3/2003 | Bidaud ................. G06F 21/577 726/25 |
| 2003/0231741 A1 | 12/2003 | Rancu et al. |
| 2005/0022194 A1 | 1/2005 | Weir et al. |
| 2005/0125188 A1 | 6/2005 | Eden et al. |
| 2005/0188262 A1 | 8/2005 | Roseman et al. |
| 2007/0157286 A1 | 7/2007 | Singh et al. |
| 2007/0269770 A1 | 11/2007 | Pellegrino et al. |
| 2008/0209270 A1 | 8/2008 | Alladi et al. |
| 2008/0320071 A1 | 12/2008 | Hoskins et al. |
| 2009/0055522 A1 | 2/2009 | Shen et al. |
| 2010/0138925 A1* | 6/2010 | Barai .................. H04L 63/1433 726/25 |
| 2011/0061104 A1* | 3/2011 | Sarraute Yamada .... H04L 43/50 726/23 |
| 2011/0296383 A1 | 12/2011 | Pasternak |
| 2012/0003982 A1 | 1/2012 | Natarajan et al. |
| 2012/0072968 A1 | 3/2012 | Wysopal et al. |
| 2012/0151588 A1 | 6/2012 | Wang et al. |
| 2013/0061093 A1 | 3/2013 | Choi |
| 2013/0235727 A1 | 9/2013 | Campbell et al. |
| 2014/0047545 A1 | 2/2014 | Sidagni |
| 2014/0109051 A1 | 4/2014 | McDonald et al. |
| 2014/0137257 A1 | 5/2014 | Martinez et al. |
| 2014/0157241 A1 | 6/2014 | Fishaimer |
| 2014/0173739 A1 | 6/2014 | Ahuja et al. |
| 2014/0250331 A1 | 9/2014 | McCoy et al. |
| 2015/0169432 A1 | 6/2015 | Sinyagin et al. |
| 2015/0242294 A1 | 8/2015 | Lapierre et al. |
| 2015/0261933 A1* | 9/2015 | Chiu ..................... H04L 12/1822 705/3 |
| 2015/0372980 A1 | 12/2015 | Eyada |

OTHER PUBLICATIONS

Written Opinion of the International Searching Authority dated Nov. 18, 2015, for PCT Application No. PCT/US2015/043837, filed on Aug. 5, 2015, 4 pages.

* cited by examiner

CYBER SECURITY POSTURE VALIDATION PLATFORM

CROSS-REFERENCE TO RELATED APPLICATION

This application is a continuation of U.S. patent application Ser. No. 14/818,975, filed on Aug. 5, 2015, now U.S. Pat. No. 10,812,516, which claims the benefit of U.S. Provisional Patent Application No. 62/033,435 filed on Aug. 5, 2014, the contents of which are incorporated by reference in their entireties.

TECHNICAL FIELD

The subject matter described herein relates to cyber security assessment platforms, and particularly, platforms for assessing organizational network security posture.

BACKGROUND

Organizations commonly store confidential information, trade secrets, intellectual property, and other critical data within internal networks. Critical data within these networks are highly valued by the proprietor and thus security of the networks is of paramount importance. However, because these networks often include assets of various forms such as computers, servers, routers, and smartphones, cyber security teams struggle to defend such diverse, distributed assets throughout an organization with limited resources and an incomplete view of where the biggest risks are.

Recently, external attackers and malicious insiders have been successful in breaching the network perimeter of organizations, gaining access to critical assets, moving laterally within the network and exfiltrating critical private data. Accordingly, the ability to quickly and diligently react to a breach is crucial for an organization's security team.

Moreover, many organizations are federally mandated to comply with industry-specific regulations such as the Federal Information Processing Standards (FIPS) and guidance (National Institute of Standards and Technology (NIST) 800 Series). These organizations, however, often lack sufficient methods to validate their networks for compliance with specific regulations or realistic attacks against their security controls, architecture, and processes. Many organizations also lack a method to measure the effectiveness of remediation strategies after weaknesses are identified. Even when remediation is possible, it is frequently unclear how it will adequately affect an attacker's capability to further compromise the organization through advanced stages of the attack cycle.

Conventional methods for validating the security posture of assets and the overall network architecture tend to take on perimeter technologies by focusing exclusively on assessing external penetration risk. Consequently, these methods tend to involve tests and remediation that focus purely on the initial step of the attack cycle, e.g., vulnerability scanning and patch remediation. Some existing systems take into account post-exploitation, but these do not look at, for example, security gaps, realistic attack technique and adversarial modeling, or how well the holistic defensive measures match up against them. Existing systems do not run scenarios in real-time. Thus, they do not have the ability to validate in real-time compliance with specific requirements (such as those from regulations/mandates) or identify security weaknesses in the context of the environment or how various defense measures can be improved. In addition, these systems do not have the ability to compare organizations in the same industry in terms of attacker types and defensive or lack thereof, structural likeness.

SUMMARY

The current subject matter provides a system for testing an organization's cyber security posture. This can include, for example, compliance with one or more network and/or security requirements, and security posture as defined by actions, and reactions in response to real-world attack such as by key security architectures, processes, and policies.

The current subject matter is directed to assessing security of a computer network and/or validating data integrity and other aspects of a computer network. Data can be received (E.g., by at least one data processor forming part of at least one computing system, etc.) that specifies a scenario. The scenario can include a plurality of phases defining an execution path and at least one selected asset of the network on which to execute the plurality of phases.

The method also includes initiating deployment, by at least one data processor, at least a portion of the scenario to the at least one selected asset for execution by the at least one selected asset. Upon execution, outcome data characterizing an outcome for each of the phases can be received from the at least one selected asset, and the outcome data can be provided.

In some variations, the outcome data can be provided via, for example, storing the outcome data, loading the outcome data into memory, transmitting the outcome data to a remote computing system, or displaying the outcome data in a graphical user interface.

In some variations, the data specifying the scenario includes the plurality of phases and the execution path are generated to validate a device or network status in compliance with one or more predefined network integrity standards.

In some variations, the data specifying the scenario includes the plurality of phases and the execution path are generated to mimic an unauthorized attack of the network by a third party via the selected at least one asset.

In some variations, the method can also include collecting, by at least one data processor, attack intelligence data representing the unauthorized attack. The attack intelligence data can include one or more indicators of attack of the unauthorized attack. One or more attack intelligence elements can be generated based on one or more elements collected from the attack intelligence data, and utilized to generate the execution path of the phases of the scenario.

In some variations, the method can also include collecting, by at least one data processor, attack intelligence data representing the unauthorized attack. The attack intelligence data can be analyzed to determine whether the unauthorized attack is destructive. If the unauthorized attack is determined to be destructive, the method can include determining whether the unauthorized attack is reversible. If the unauthorized attack is irreversible, the method can also include generating an alert to prevent the scenario from being executed in a way that is irreversible.

In some variations, the method can also include deploying, by at least one data processor, at least a portion of the scenario to a further asset of the network. The execution path of the phases can include a coordination of the asset and the further asset.

In some variations, at least the portion of the scenario is stored in a local cache of the selected at least one asset such that the execution of at least the portion of the scenario by the at least one asset can be executed from the local cache. In some variations, the portion of the scenario stored on the local cache is encrypted.

In some variations, the scenario further includes at least one parameter (argument) controlling the execution of at least one of the plurality of phases.

In some variations, the method further includes initiating, by at least one data processor, execution of at least the portion of the scenario by the selected at least one asset.

The current subject matter also provides a computer-implemented method for assessing security and/or validating data integrity and other aspects of a computer network through at least one selected asset. At least a portion of a scenario that comprises a plurality of phases defining an execution path can be received and executed (e.g., by at least one data processor forming part of at least one computing system, etc.) by the asset. An outcome for each of the phases can be determined by the at least one asset and outcome data characterizing the determined outcome for each of the phases can be provided.

In some variations, the plurality of phases and the execution path are generated to validate a device or network status in compliance with one or more predefined network integrity standards.

In some variations, the plurality of phases and the execution path are generated to mimic an unauthorized attack of the network by a third party via the at least one asset.

In some variations, the executing comprises coordinating one or more actions with at least one further asset on the network.

In some variations, at least the portion of the scenario is stored in a local cache of the selected at least one asset, wherein the execution of at least the portion of the scenario by the at least one asset is executed from the local cache. In some variations, the portion of the scenario stored on the local cache is encrypted.

In some variations, the scenario further includes at least one parameter controlling the execution of at least one of the plurality of phases.

In some variations, the method also includes initiating, by the at least one asset, communication with a console on the network before receiving at least the portion of the scenario from the console.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

In some variations, the current subject matter combines automated dissemination of real-world cyber-attack intelligence with construction of an attack scenario and an efficient deployment mechanism. In some variations, real-time discernment of results based on execution of multiple attack scenarios can be used to show potential variations on measured real world attacks. For example, these scenarios can target one or more assets, and can contain multiple stages, allowing them to be as realistic as possible. Additionally, the system can chain multiple scenarios to simulate a complex and target attack.

In some variations, the current subject matter can provide scenarios for validating, in real-time, security infrastructure for compliance with one or more requirements (e.g., from regulations/mandates).

In some variations, the system can be configured to recommend effective and efficient remediation based on one or more gaps in the posture in response to mimicked real-world scenarios. These recommendations can help an organization strategically respond to possible scenarios and mitigate potential threats before they become an issue.

The current subject matter provides many advantages. For example, by taking a holistic approach (rather than taking an entirely external viewpoint), the current subject matter can test the architecture, processes, and procedures of an organization's network to ensure that an attack can be stopped, contained, and responded to in an efficient manner. The current subject matter can also cover any breadth and depth of an organization's layered defense strategies.

Furthermore, rather than focusing on piecemeal attacks, the current subject matter can provide a report of how existing defensive strategies can and will respond to a complete attack. The current subject matter also enables testing of a full-fledge attack on the organization's actual network/system without compromising the integrity of that network/system (e.g., causing damage and/or rendering it unreliable). Because the testing is carried out on the actual network/system, the result is real.

Still further, by considering more fully the manner a real-world attack happens, the current subject matter can find vulnerability in existing assets and in the existing security controls an organization has placed to attempt to protect itself.

The details of one or more variations of the subject matter described herein are set forth in the accompanying drawings and the description below. Other features and advantages of the subject matter described herein will be apparent from the description and drawings.

DETAILED DESCRIPTION

The current subject matter can include one or more major elements that can work in concert to produce an efficient method of security analysis. These major elements can be implemented individually or in variable combinations, for example, as will be discussed below.

References will now be made to FIG. 1, which depicts an example of a security posture testing/validation system in accordance with the current subject matter. In some variations, the security posture testing/validation system test/ validate security infrastructure for compliance with, for example, specific requirements (e.g., from standards, regulations and/or mandates). In some variations, the security posture testing/validation system can also test/validate security infrastructure against potential attacks (e.g., a scenario that mimics a known cyber-attack).

Figure 1:
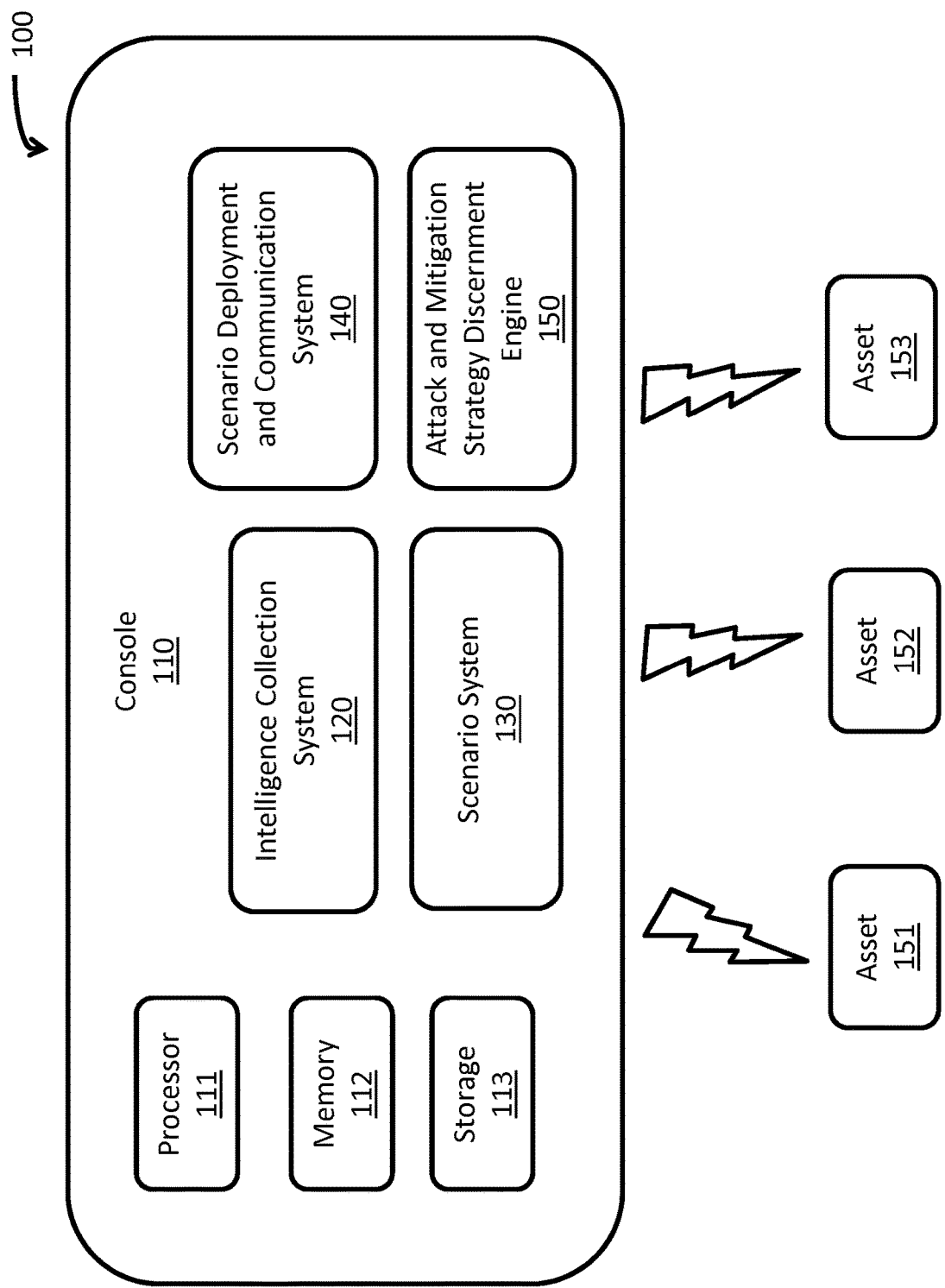
FIG. 1 is a diagrammatic illustration of an example of a security posture testing/validation system in accordance with the current subject matter.

As shown in FIG. 1, security posture testing/validation system 100 includes a console 110 and assets 151-153 that are in data communication with one another. In some variations, one or more assets can communicate with each other as well. These are provided merely for illustrative purposes and do not limit the current subject matter. For example, the current subject matter can include any number (e.g., more or fewer) of consoles and/or assets.

Console 110 can be implemented, for example, on a server or a personal computer that is connected to a network or cloud. As shown, console 110 includes one or more processors 111, memory 112, and storage 113. Console 110 also includes intelligence collection system 120, scenario system 130, scenario deployment and communication system 140, and attack and mitigation strategy discernment engine 150. One or more of the systems 120-150 can be implemented, for example, as one or more software and/or hardware modules. In some variations, one or more of the systems and engine can be implemented using computer instructions that are, for example, stored in storage 113, and can be executed by processor 111 to perform one of more features discussed herein.

Assets 151-153 can be any device on the organization's network to be tested such as (for example) personal computers, servers, smart phones, or other computing devices.

Attack intelligence collection system 120 can be configured to obtain threat intelligence internally and/or from external sources. In some variations, it can collect, analyze, and leverage that information to formulate a related scenario. System 120 can be configured to include one or more of the features described below.

In some variations, system 120 can be provided with the ability to place honeypots, attracting attackers into the system and measuring the various phases of their attack from point of entry, persistence, and onward, which can be recorded so they can be, for example, duplicated at a later point.

In some variations, system 120 can be provided with a threat intelligence information repository where specific attack intelligence can be stored and used. It can contain and operate on one or more common tools and standards for identification of threat intelligence including, for example, Open Indicators of Compromise (OpenIOC) framework, Vocabulary for Event Recording and Incident Sharing (VERIS), Cyber Observable eXpression (CybOX), Incident Object Description and Exchange Format (IODEF), Trusted Automated eXchange of Indicator Information (TAXII), Structured Threat Information Expression (STIX), Traffic Light Protocol (TLP), Open Threat Exchange (OTX), and Collective Intelligence Framework (CIF). One or more of these feeds can be imported into the system and translated into an attack scenario representative of the source information. These scenarios can be automatically or manually paired for use in a complex generated scenario.

In some variations, system 120 can be provided with the ability to take as input public blogs, articles, reports, and threat feeds and match them with public or privately accessible artifacts of the attack (e.g., Indicators of Compromise/ Structured Threat Information eXpression/Trusted Automated eXchange of Indicator Information (IOCs/STIX/ TAXII) format) and then automatically and/or manually separate the attack into technical phases. The phases can be put together as a scenario, and in some variations, made available in a scenario subscription feed. This process can work either or both manually and automatically. For example, point of entry can have a number of terms to mean the same thing and, in some variations, the current subject matter can be configured to search through these documents and perform, for example, semantic analysis to determine these phases, and/or perform keyword search using known techniques.

In some variations, intelligence collection system 120 can create one or more attack intelligence elements using public and/or private sources by employing one or more of: Collecting information (e.g., periodically, automatically, and/or manually) from one or more sources (these sources can be, for example, web pages, Rich Site Summary (RSS) or Atom Syndication Format (ATOM) feeds, or other structured and/ or unstructured elements); creating an attack intelligence element based on one or more elements collected from the feeds; storing each attack intelligence element in the attack intelligence collection system 120 and making them available for scenario creation.

Figure 16:
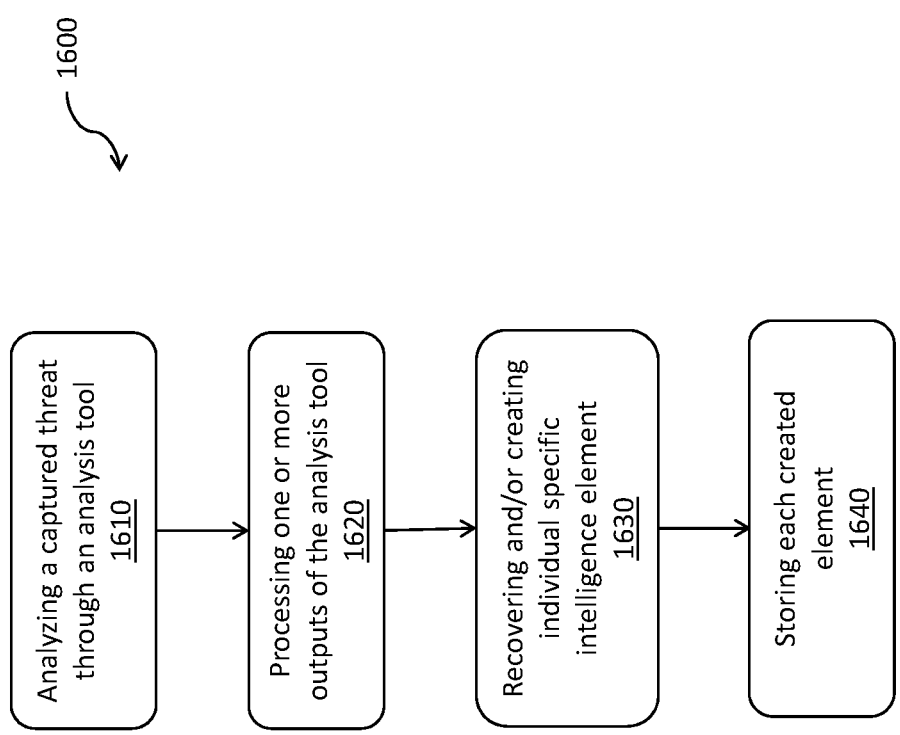
FIG. 16 depicts a process flow diagram of an example of creating attack intelligence elements.

In some variations, the system can create one or more attack intelligence elements using analysis by employing one or more of (see flowchart 1600 of FIG. 16): Putting a captured threat through an analysis tool (employing, for example, a standard analysis technique, including, for example, static and dynamic analysis using one or more industry standard analysis tools) at 1610; processing one or more outputs of the analysis technique/tool at 1620, recovering and/or creating individual specific intelligence element at 1630; and at 1640, storing each created element in attack intelligence collection system 120, and making them available for scenario creation.

In some variations, the system can create one or more attack intelligence elements using manual means by employing one or more of: Receiving one or more individual elements and/or details about an attack (e.g., based on external knowledge by an analyst or operator, entered using a simple tool interface used to create manual attack intelligence); processing an output of the research and individual specific intelligence will be recovered and created; storing each created element in attack intelligence collection system 120, and making them available for later scenario creation.

In some variations, the system can be provided with instructions representing copy and clean-up functionality. This can include, for example, a mechanism for taking an existing set of instructions that are of interest such as a malicious program and creating a representation of the behavior of those instructions. System 120 can use this representation to create a program that will mimic the original attack and, in some variations, a paired set of instructions and program that will undo any effects caused by running the representative program. This representative program can then be used in a scenario to duplicate the effects of a malicious program or set of instructions. The associated "undo" program can be used, for example, after the scenario is run to reverse any effects, leaving the system in a clean state (or a previous state).

In some variations, system 120 can be provided with the ability to create asset module duplication. This provides system 120 with the ability given the intelligence, to recreate portions of modules within an asset to make use of within the scenario, e.g., a virtual universal serial bus (USB) drive so that the system can mimic the scenario of a malicious program being injected into the system by use of a USB key.

Traditionally, using an exploit against an asset can be dangerous, but the current subject matter can provide exploit mimicry functionality within the asset to test whether an exploit would have been successful without actually exploiting the asset. The current subject matter has the ability to generate or use an exploit payload and send it across the network using a client to communicate to a server listening on the "victim" machine where the intention is to test the "exploitability" of that machine given a particular vulnerability. The current subject matter can leverage this client-server model to allow scenarios to mimic the real-world attacks without actually causing damage. By using the mock attack across the network in combination with the attack replay system (e.g., a scenario that mimics a prior attack), the current subject matter can test exploitation without corrupting memory or experiencing any ill effects of a live attack. In some variations, the current subject matter can use a custom protocol that allows a representation of the attack to be sent rather than the real one. The representation can be secured cryptographically, and upon receipt, triggers a particular set of instructions on the target asset to be executed. The server on the "victim" machine can (with the payload and instructions) determine if the vulnerability would have been exploited given the state of the machine and any defenses put in place, e.g., Address Space Layout Randomization (ASLR), Data Execution Prevention (DEP), process memory monitoring, etc.

In some variations, system 120 can analyze an attack and determine whether the attack is destructive. For example, the system can be provided with artificial intelligence to determine: Does the attack involve deletion of files or other destructive actions? If so, can it be undone? In some variations, if the system determines that the attack is destructive, and cannot be undone (irreversible), the system can generate an alert and/or a flag to prevent generating or running a scenario that mimics the irreversible destructive attack to ensure safety of the network.

In some variations, multiple tiers of data from intelligence collection system 120 can be fed into scenario system 130. Examples of this data include, but are not limited to real attack/threat/cyber information; scenarios; mitigation strategies; and determination of what scenarios and/or mitigation technologies are used in other like-industries. In some variations, one or more of attack information can be shared with other like-industry companies, for example, in an anonymous or identifiable way.

In some variations, scenario system 130 can be configured to allow for browsing, filtering and searching of threat events, scenarios, mitigation strategies and related information and deployment of scenario mechanisms to assets within the network. Each tier of data has the ability to be linked so that organizations can read and consume threat information and decide if the various scenarios are appropriate for the organization. In some variations, mitigation strategies can be linked to the threat and scenarios within the system.

In some variations, scenario system 130 can allow a user (for example, a security auditor) to create one or more scenarios based on component parts, or edit existing scenarios to tailor for their environment. This allows the user, for example, to create specific scenarios to validate assumptions about an organization's architecture, processes and policies (for example, to validate compliance with requirements and/or security against cyber-attacks).

In some variations, scenario system 130 allows a user to write details describing the scenario (e.g., in a standard format). The user can also add references to specific real-world attack scenarios, or create a scenario entirely from their own choosing. The user can define one or more individual elements of the attack. Each element can be selected, for example, from the intelligence collection system 120, and placed in a particular stateful ordering. Once a scenario is created, it can be saved for later deployment and execution.

Figure 17:
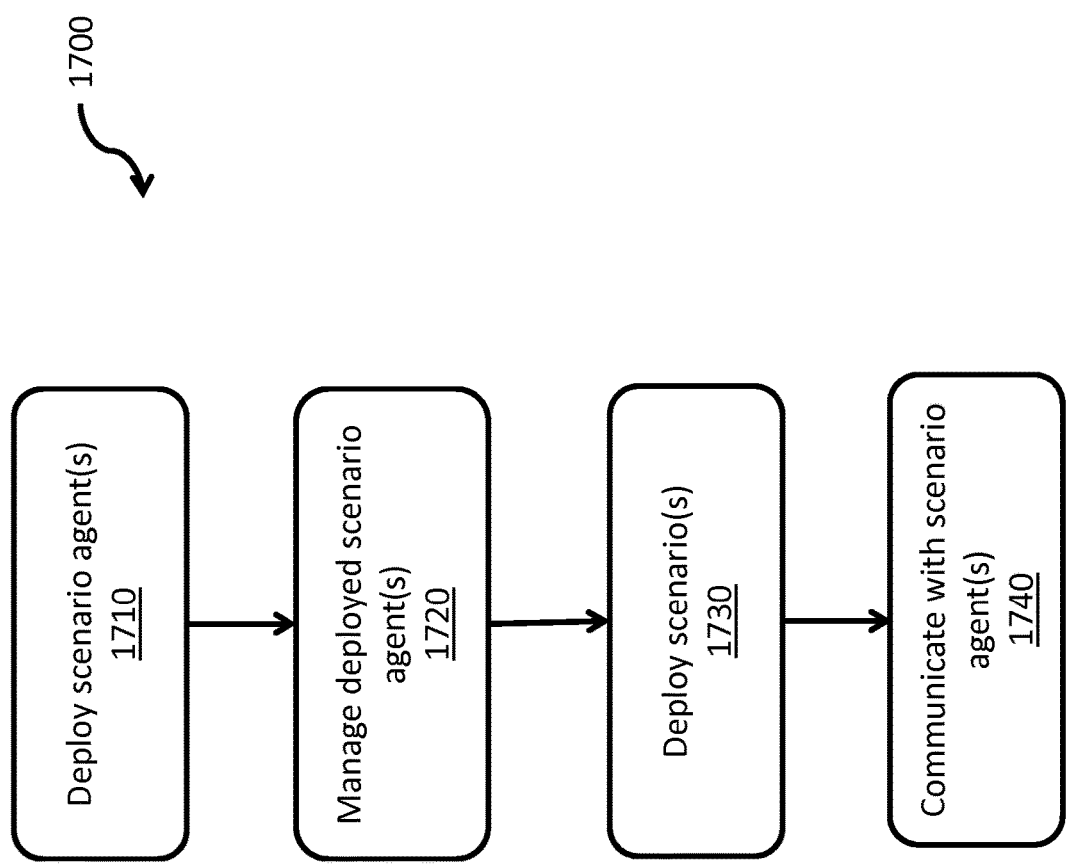
FIG. 17 depicts a process flow diagram of an example of a scenario deployment and communication.

Scenario deployment and communication system 140 can manage deployment of attack scenarios to assets and communications between individual assets and the management and reporting system (e.g., attack and mitigation strategy discernment engine 150). This system can be comparable to a director in a play who is directing multiple actors (scenario mechanisms) that are scattered throughout the stage and has the ability to log every word or movement uttered. In some variations, scenario deployment and communication system 140 can be configured to perform one or more of the following (see flowchart 1700 of FIG. 17): deploy one or more scenario agents to one or more assets at 1710; in some variations, one or more scenario agents can be deployed by a third party and system 140 can manage all the relevant deployed scenario agents (whether deployed by system 140 or third party) at 1720; deploy one or more scenarios at 1730; and communicate with scenario agents (e.g., the architecture that makes this an enterprise grade) at 1740.

As discussed above, an asset can be any device that is connected to the network being tested, and an agent is deployed at the asset to run (e.g., receive, execute, report, etc.) the scenario on the asset. In some variations, an agent is implemented as software, hardware, or both; and can be implemented either fully or partly on the asset itself or a separate device that is connected to the asset.

Figure 18:
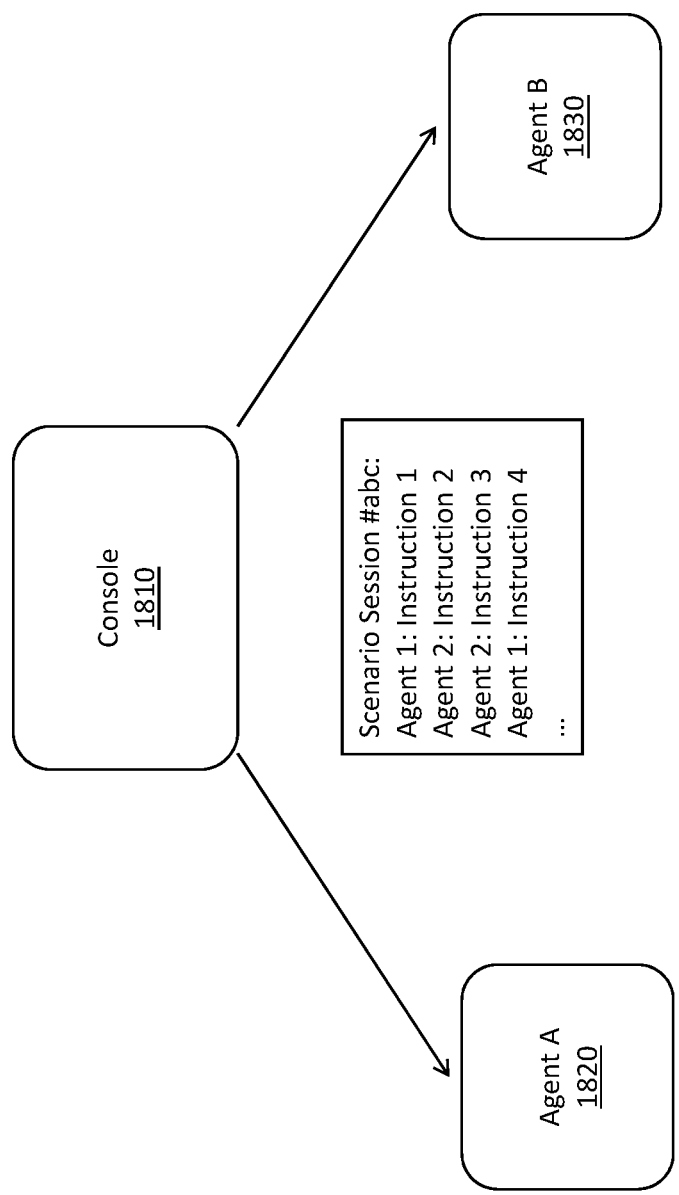
FIG. 18 depicts a diagrammatic illustration of an example of a scenario that involves multiple agents/assets.

Because a scenario can range in complexity, as discussed above, the scenario deployment and communication system 140 can act like a director in a play who is directing multiple actors (assets/agents) that are scattered through the stage (the network being tested) and has the ability to log every word or movement uttered (results and reports). A simple scenario can involve only a single asset. A more complex scenario can involve multiple assets each having a part in the scenario. For example, in a more complex scenario, asset/agent 1 can call in to system 140 and receive a scenario (including one or more portions that are to be executed by asset/agent 1), and asset/agent 2 can call in to system 140 and receive its portion(s) of the scenario. See, for example, FIG. 18 which shows a console 1810 in communication with agent A 1820 (on a first asset) and agent B 1830 (on a second asset). Here, agents A and B are both involved in the same scenario (having a scenario session ID) managed by console 1810. Console 1810 can send agent A at least a portion of the scenario that involves agent A (e.g., instructions 1 and 4) and send agent B at least a portion of the scenario that involves agent B (e.g., instructions 2 and 3). The instructions tell the respective agent the part it plays in the scenario so it knows what part to play (e.g., what instructions and code to execute). This way, a scenario can be executed in concert with a plurality of agents, for example, to perform an orchestrated attack or validation involving multiple agents. This is different than the console sending the same scenario to multiple agents for each to execute the entire scenario independently. In this example, each agent receives the scenario and only plays a certain part of the scenario (e.g., communicating to other assets or agents).

In some variations, an asset can have a persistent data connection with scenario deployment and communication system 140. In some variation, the data connection is periodic.

In some variations, the data communications between the system 140 and the asset(s) are encrypted, for example, using public/private keys. In some variations, the scenarios are signed with a certificate, and the assets only execute the scenario if the certificate is valid. In some variations, system 140 and the asset(s) communicate via a secure protocol such as Hyper Text Transfer Protocol Secure (HTTPS). In some variations, an asset can use an individual token identifier in lieu of a certificate to identify itself.

In some variations, only the asset can initiate communication with scenario deployment and communication system 140; system 140 cannot initiate communication with the asset. For example, an asset can initiate and communicate with scenario deployment and communication system 140 periodically (e.g., once every hour) to check if system 140 has any jobs/scenarios for it. If so, the asset downloads the jobs/scenarios and stores it, for example, in a local memory cache (e.g., least recently used (LRU) cache). In some variations, the asset has the option to keep the scenario(s) in the local cache so it does not need to download the scenario(s) repeatedly.

Deploying and executing attack scenarios generate a series of results. These results can be sent to the attack and mitigation strategy discernment engine 150. Each asset records the output of any scenario elements that were executed. In some variations, all scenario results are collected in a centralized attack and mitigation strategy discernment engine 150.

The combination of the results from a scenario across one or more assets can be used to generate a report and/or trigger additional analysis. For example, the results can define the success or failure of an attack and/or pass or failure of the defensive technologies that are relevant to the attack (which is what the security is measured on). A report can be generated, for example, to validate the defensive technologies. In some variations, the attacks that succeed can be paired with appropriate contextual mitigations and the full output can be generated into a report.

In some variations, the attack and mitigation strategy discernment engine 150 can recommend technological mitigations for an asset and/or for the overall network compromised of all assets. In some variations, the system can prioritize technological mitigations among, for example, assets, groups of assets, and the entire network. In some variations, attack and mitigation strategy discernment engine 150 can include one or more of the following: Analytics and reporting (e.g., differential reporting); and/or related mitigation strategies that can expose how layered defense stack up versus a single point defense.

Figure 2:
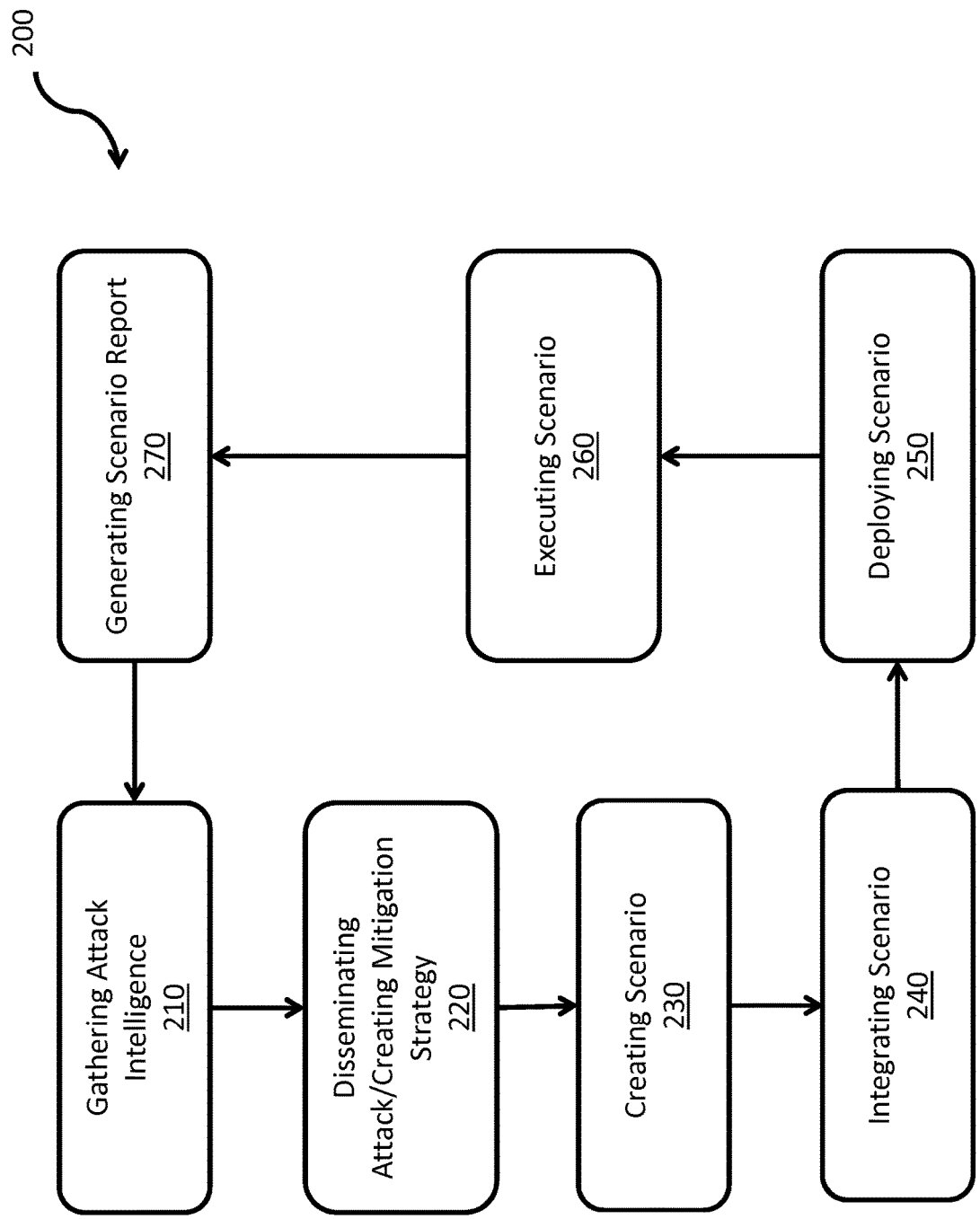
FIG. 2 is a process flow diagram of an example of a security platform in accordance with some variations of the current subject matter.

FIG. 2 depicts an example of process flow 200 of a security platform in accordance with a variation of the current subject matter. This non-limiting example is provided for illustrative purposes only. In some variations, one or more features can be, for example, omitted or substituted, and the process flow of the features can be different.

At 210, attack intelligence can be gathered and analyzed manually and/or automatically. For example, it can be collected by receiving and processing public and private feeds. The attack intelligence can also be collected from intelligence elements collected and integrated, for example, directly from an organization's analysis of existing analyzed threats. In some variations, this information can be stored in the attack intelligence collection system 120.

Once information on an attack is gathered, the current subject matter can disseminate/analyze the attack and/or create mitigation strategy at 220. In some variations, this includes breaking down the attack into one or more phases, and generating an execution path of the phases that mimics one or more indicators of the attack.

The analysis can be used manually and/or automatically, to create a scenario at 230. The scenario can include, for example, one or more phases of an attack in a particular execution path. For example, some phases can be executed sequentially and some phases can be conditionally (or any combination thereof).

In some variations, the attack scenario can be created to mimic what a particular attack is capable of doing. For example, an attack scenario can be defined by creating an appropriate attacker set of behaviors that simulates the phases of a common attack cycle. In cases where specific real world details are available, it can follow those as closely as possible. In scenarios where specific real world data is not available due to incomplete public data or weak analysis, known elements of the attack can be staged within a common framework. In some variations, scenario creation and management can be handled by scenario system 130.

In some variations, a scenario can be created to perform validation of one or more assets (that is not necessarily part of an attack). For example, it may be important to check that a particular port is always open to receive a particular communication and/or that a particular port must always be closed (for example, for compliance purposes). One or more validation scenarios can be generated (automatically and/or manually) for such purposes. This provides validation of the assets in real-time. In some variations, the scenario can be scheduled to run automatically as desired (e.g., based on a schedule input) to continually validate the assets in real-time.

The process of creating a scenario can include one or more of the following: Creating an overview of the scenario. This can include, for example, any real-world details (news reports, external validation of the attack, etc.); and creating one or more series of phases (steps/actions) that match those in the real-world attack cycle. In some variations, the phases may include one or more of, for example: "Injection," "Escalation," "Hiding," "Gaining Persistence," "Lateral Movement," "Command and Control," "Exfiltration," and "Cleanup." The scenario creation and also include associating a set of elements from the intelligence collection system 120 for each phase. In some variations, an order and/or success criteria that can be used by current subject matter to determine whether the attack was successful can be included for each element. In some variations, scenario creation can include inheriting one or more technical mitigation strategies associated with each element included from the attack intelligence collection system 120. In some variations, scenario creation can include creating and defining one or more attack scenario mitigation strategies beyond those included in individual scenario and phase elements.

At 240, once a scenario has been created, it can be integrated into the security posture testing/validation system 100. In some variations, this can include uploading/downloading the scenario to the console, for example, by a user or by a process in a manual and/or automated way.

In some variations, scenarios are instructions with one or more parameters (or "arguments"). Examples of the parameters include binary variables (e.g., true/false), text, numeric, etc. In some variations, a scenario can include one or more default parameters. In some variations, a scenario can include one or more parameters that require user input. In some variations, a user can add one or more additional parameters.

In some variations, the console can be provided with one or more default scenarios (or "models") that have one or more parameters that are required, but not supplied. Thus, the model (scenario) cannot run until the required parameter(s) are supplied. In some variations, such model (scenario) can be given those required parameters in real-time, for example, when the scenario is to be run (e.g., the scenario should be run right now, or at a scheduled time). In some variations, a model (scenario) with different parameters can be saved as different scenarios (or variations of a model scenario) so that they can be readily run. In some variations, combining a scenario and parameters can be done manually and/or automatically. For example, given certain events, scenarios can be paired with parameters automatically and either saved for later run or run automatically (e.g., once or scheduled on an ongoing basis).

In some variations, scenario integration can also involve grouping of scenarios. This can be done manually and/or automatically, for example, to group certain scenarios to run together. In some variations, not only the individual outcomes of the scenarios are reported, but the group outcome(s) as well. For example, in a group of scenarios called endpoint antivirus (AV) testing, the group can be clustered to run 10 scenarios, either all on the same asset where the agent is, or can be specified such that scenario 1 runs on asset 4, and scenarios 1-5 run on assets 4-8, etc. In this way, a grouping can represent multiple scenarios running on one or more assets/agents, and the outcome(s) can be failed, for example, if any of the scenarios failed. In some variations, the percentage failed and/or passed can be determined, for example, if all the scenarios failed across the multiple assets.

In some variations, scenario integration can involve other customization. For example, the console can be provided with the ability to schedule one or more scenarios to be run at a pre-determined time and/or interval. As an example, one or more scenarios can be run at a particular time and/or date period given a particular interval. In some variations, one or more scenarios can be run at a random time. For example, a scenario can be scheduled to be run "randomly" once every hour at a random time during the 60-minute period. Other variations are also possible (e.g., run "randomly" twice a day on the hour, within the 24-hour period.).

At 250, one or more scenarios can be deployed and run in the network environment in a manual and/or automated manner on one or more assets at 260. In some variations, the deployment process can be handled by scenario deployment and communication system 140, and the execution is run by one or more of the assets selected by one or more scenarios. As discussed above, a scenario can be deployed to multiple assets to be run independently, or in some variations, a scenario can involve multiple assets in a particular execution path, each playing (executing) its part (e.g., one can act as a server and the other a client, and they each have a script as to what to do).

The result of deploying and running the scenarios expose which phases of the attack scenario(s) or validation scenario(s) were successful and which were not, and are generated and transmitted to console 110, which can generate a scenario report at 270. These results (e.g., scenario report) can be analyzed, for example, by the attack and mitigation strategy discernment engine 150 to determine outcomes of tests. The attack and mitigation strategy discernment engine 150 can recommend technological mitigations for an asset and for the overall network compromised of all assets. The engine 150 can also be configured to prioritize technological mitigations among, for example, assets, groups of assets, and the entire network.

Figure 2A:
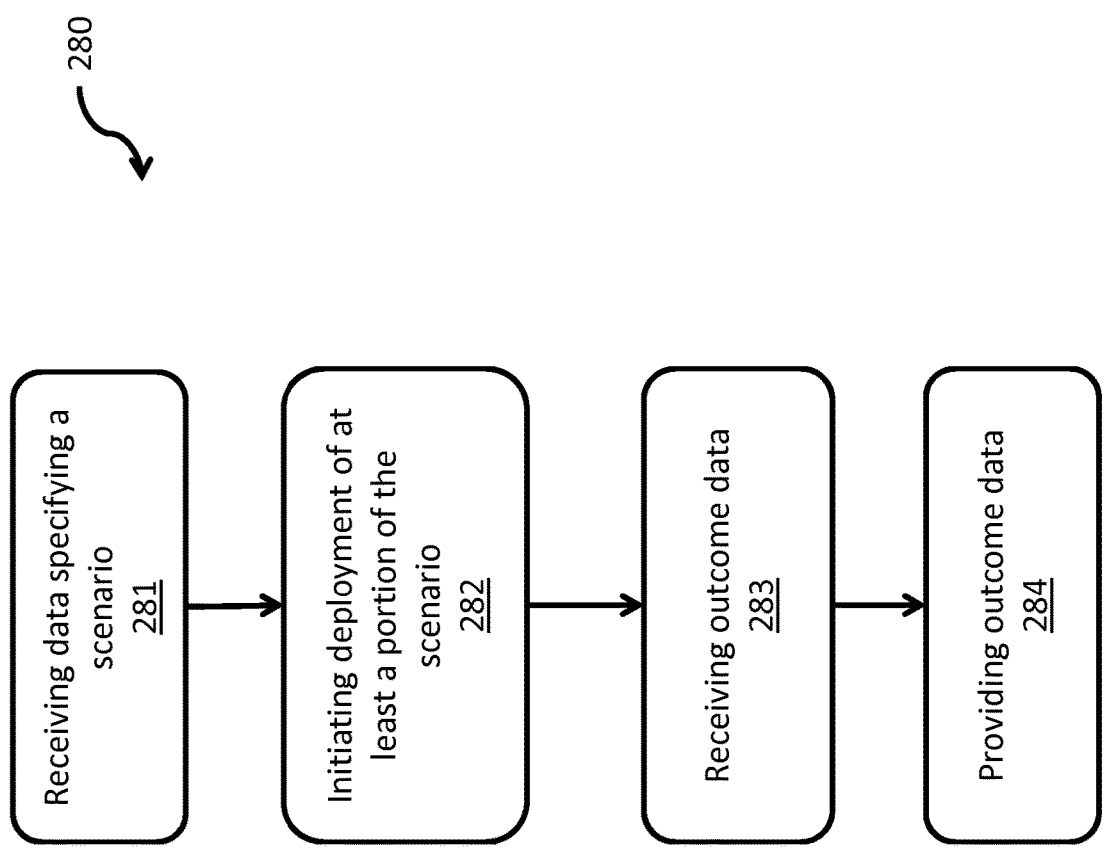
FIG. 2A is a process flow diagram of another example of a security platform in accordance with some variations.

In some variations, as shown in FIG. 2A, the current subject matter provides a method 280 for assessing security of a network. The method includes receiving data specifying a scenario at 281. In some variations, the scenario includes one or more phases defining an execution path and at least one selected asset of the network on which to execute the plurality of phases. At 282, the method initiates deployment of at least a portion of the scenario to the at least one selected asset (e.g., one or more of assets 151-153). At 283, outcome data characterizing an outcome for each of the phases are received. At 284, the outcome data are provided.

Figure 3:
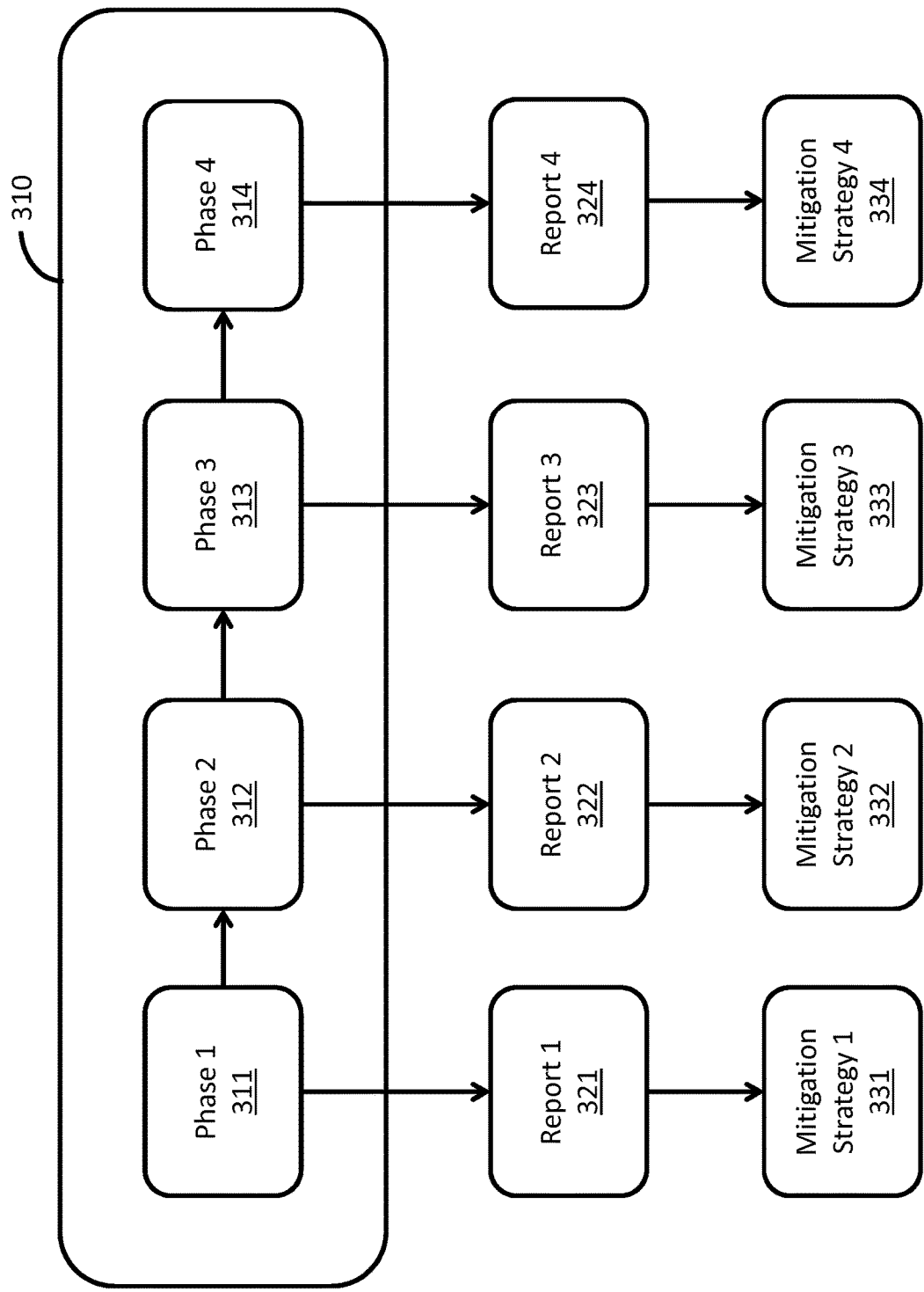
FIG. 3 is a diagrammatic illustration of an example of a scenario and the resulting reports and mitigation strategies.

FIG. 3 depicts an example of a scenario and the resulting reports 321, 322, 323, 324 and mitigation strategies 331, 332, 333, and 334. As shown, Scenario 310 includes phases 311-314 defining an execution path (e.g., sequentially, logically, or combinations thereof). It should be noted that four phases are included merely for illustrative purposes only; a scenario can have any number of phases.

After each phase is executed by the asset, a pass/fail is returned. In some variations, each phase can be categorized as "critical" or "not critical" (e.g., designated when the scenario is created). The outcome of each phase and the scenario overall can result in an outcome of pass or fail based on if any "critical" phases fail. Mitigation strategies can be generated based on phase outcomes and scenario results.

In some variations, the attack scenario deployment and communication System 140 can be configured to handle one or more of the deployment, execution, and reporting of the created attack scenarios. In some variations, it can be configured to work across multiple assets covered by a scenario. The attack scenario deployment and communication system 140 can be configured to deploy a scenario to an asset using an appropriate mechanism (e.g., an internal deployment mechanism and/or an external third-party deployment mechanism). In some variations, this can include transferring a set of instructions to do and/or undo one or more intended effects. In some variations, this can be used to mimic a network injection of an attack to properly test the external security mitigation technologies (Intrusion Prevention System (IPS), Intrusion Detection System (IDS), firewalls, etc.).

The attack scenario deployment and communication system 140 can also be configured to send instructions for the scenario to one or more agents running on deployed assets. In some variations, an agent can be running directly on the deployed asset (e.g., as a module and/or software running on the deployed asset). In some variations, an agent can be run via a separate computing device that is attached to the deployed asset (e.g., as a separate module connected to the deployed asset, for example, through USB, Bluetooth, etc.).

These deployed assets can execute their given instructions of the scenario (playing their part of the scenario, for example, independently or working with each other). Upon execution of the instructions, system 140 can receive one or more communications from one or more agents running on deployed assets. In some variations, the communications can be transmitted to one or more of: the scenario, the mitigation strategy discernment engine 150, and other agents involved in the scenario.

In some variations, the instructions of the scenario can be configured so that the local agent on the asset can execute "cleanup" instructions to reverse one or more effects of the executed scenario. In some variations, the agent itself can optionally remove any artifacts sent with the scenario.

In some variations, once a scenario has run to completion on one or more (e.g., all) assets, and the assets have reported the results of individual scenario operations to one or more servers (e.g., a central server or machines that are spread out horizontally to handle the load (a cluster of machines)), the attack and mitigation strategy discernment engine 150 analyzes the output and creates a full report that can include one or more report for the scenario, for the phases, for the mitigations and for the identified security gaps, including all appropriate contextual remediation suggestions based on the context of the environment and structure of the organization. In some variations, the attack and mitigation strategy discernment engine 150 can prioritize one or more phases of one or more scenarios to determine one or more of, for example, "failed," "passed," "detected," or other custom outcomes desired by the user. In some variations, a percentage success can be matched, as well as recommendation mitigation strategies based on the situation awareness context gathered from one or more intelligence gatherer.

In some variations, situational awareness can be gathered via one or more of, for example: Input from a third-party or internal network schematic data scanner or static data, e.g., network scanner, network schematic engine, or manual input of machine type and information; and/or input gathered as phases of a scenario is run and data is sent back to the main engine to take notes on the environment.

In some variations, one or more output can be geared towards reporting on a particular asset and prioritizing the weakest asset in the network. The asset information can be generated to look at what scenarios and phases were successful on the asset itself and what technologies were bypassed (missed) based on scenario phases.

In some variations, the console can be configured with triggers so that upon receiving output of, for example, a particular attack or validation scenario, the outcome and output are sent and/or made available to other input mechanisms in the network.

In some variations, the console can be configured to receive input from one or more sources, and initiate a search for related scenario(s) to launch automatically. The input could come, for example, from the correlated results of existing scenarios, the outcome of a scenario run, or it can be fed in from internal and/or external intelligence sources for the finding new weaknesses in the network.

Figure 4:
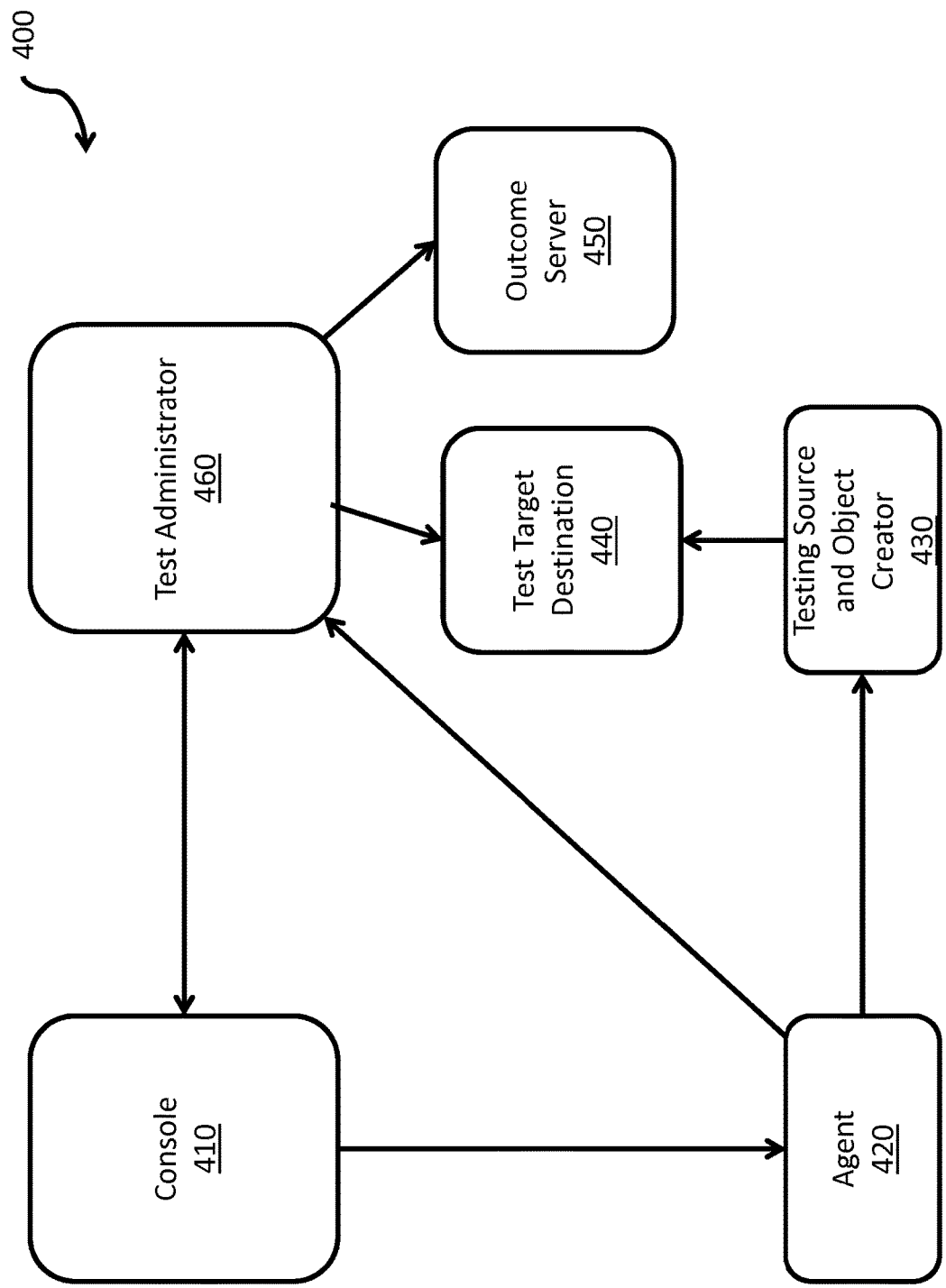
FIG. 4 is a diagrammatic illustration of an example of the current subject matter for testing a target destination.

In some variations, a scenario can include one or more arguments (variables that can be defined, for example, by a user) that can be sent to an agent (e.g., an asset that exists in-premise or in the cloud) who in turn instructs external infrastructure to generate one or more related objects that can test a specified destination. For example, referring to implementation 400 of FIG. 4, console 410 can send agent 420 a scenario for testing target destination via testing source and object creator 430. Agent 420 receives the scenario and instructs testing source and object creator 430 to generate a related object that tests target destination 440 (e.g., a network packet based on the arguments sent in the scenario). Test administrator 460 (who can, for example, sit on a separate machine or the same machine as target destination 440) can determine if target destination 440 was successful in testing for the object. Test administrator 460 can also check the outcome server 450 as to whether the target destination has sent its outcome of the test. When Console 410 sends the scenario to the agent 420, it can also ask the test administrator to validate the test outcome.

In some variations, the test administrator 460 can judge when the scenario(s) ran and the events that were created as a result of the scenario running were detected by a SIEM (outcome server) 450. In some variations, if the events were detected, then the test/scenario passes or is deemed "detected;" or if the events were not detected, then the test/scenario is deemed failed. The agent 420, which can be on or next to the asset (testing source), can be the source of those events. In some variations, the agent/test source 420 can cause events to happen on another destination target 440. Either way, events can be sent to the SIEM (outcome server) 450 from the source 420 and/or destination 440. The test administrator 460 can check the outcome server to see if the events were detected by seeing if events related to the scenario were sent to the SIEM (outcome server) 450.

Figure 5:
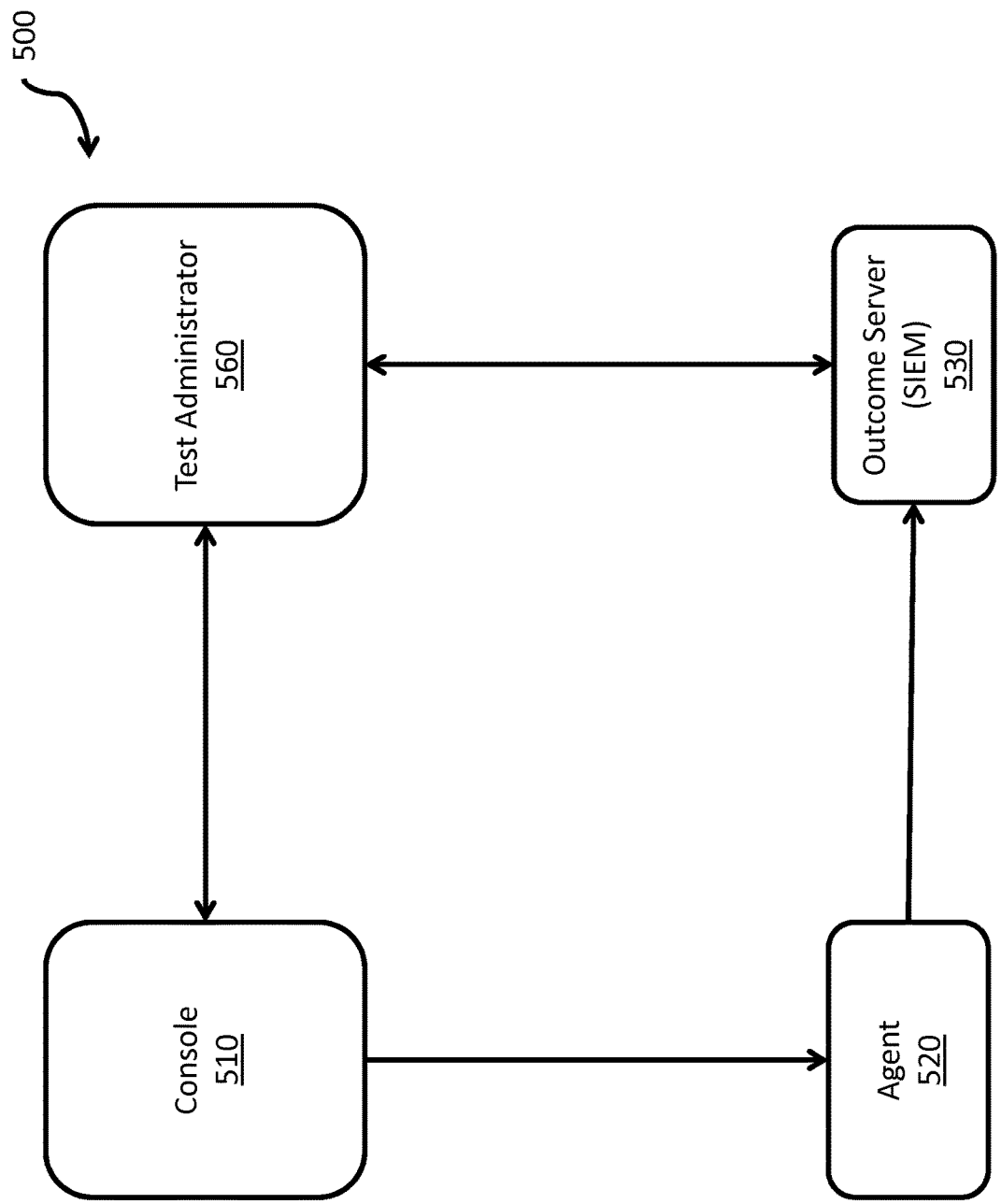
FIG. 5 is a diagrammatic illustration of another example of the current subject matter involving a Security Information and Event Management (SIEM)

Referring to implementaion 500 of FIG. 5, in some variations, security abnormalities are automatically reported and stored in SIEM 530 (Security Information and Event Management), which can act as the outcome server. In such cases, agent machine 520 can execute the scenario and report the outcome to the SIEM, for example, via a third party security control technology. Test Administrator 560 can check the outcome through the SIEM. This way, Console 510 can also ask Test Administrator 560 to validate the test outcome from the inside.

Figure 6:
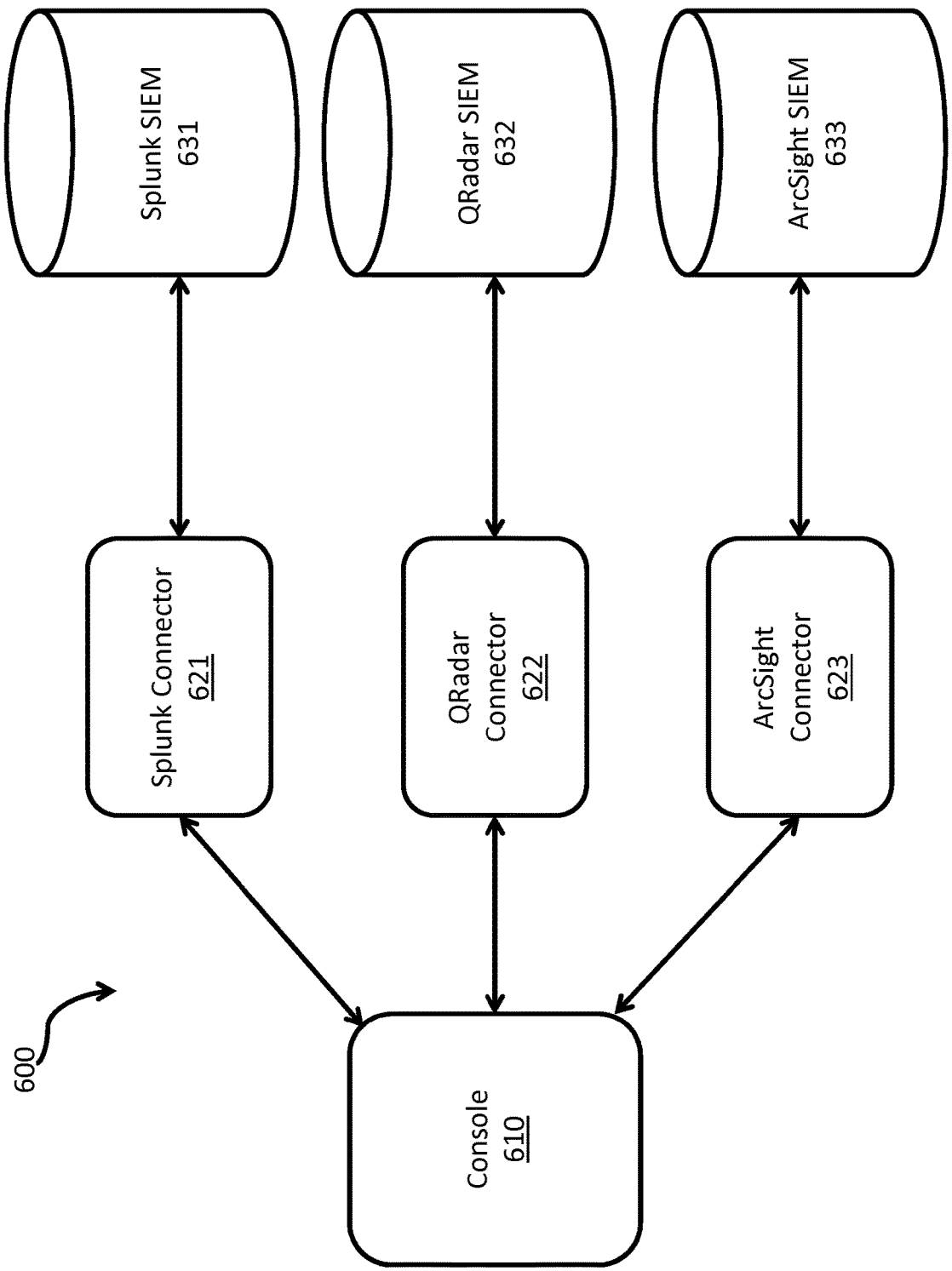
FIG. 6 is a diagrammatic illustration of an example of current subject matter that enables a console to connect to different types of SIEMs.

In some variations, the current subject matter allows, for example, the console to communicate with one or more SIEM via one or more connectors, as shown in implementation 600 of FIG. 6. Here, Console 610 can communicate with Splunk SIEM 631 through Splunk Connector 621. Console 610 can also communicate with QRadar SIEM 632 through QRadar Connector 622. Likewise, Console 610 can communicate with ArcSight SIEM 633 through ArcSight 623. These connectors can take input (for example, about when a scenario was run from the console and answer questions about events that were found related to the scenario. In other words, each connector can speak the "language" of a particular SIEM. By communicating with each SIEM through respective connectors, the console can query each SIEM about particular scenarios that had run on the network monitored by the SIEM and validate the result. For example, Console can query a SIEM about a particular scenario (Y) that was sent to an agent machine (X) between time period A and B, and ask the SIEM what events were generated by the scenario (Y) on the agent machine (X) by the SIEM. In some variations, the SIEM is given a specified amount of time (C) to answer. Being able to communicate with the SIEM to access data in the SIEM that are related to a scenario is useful, for example, to validate the network's monitoring process.

Figure 7:
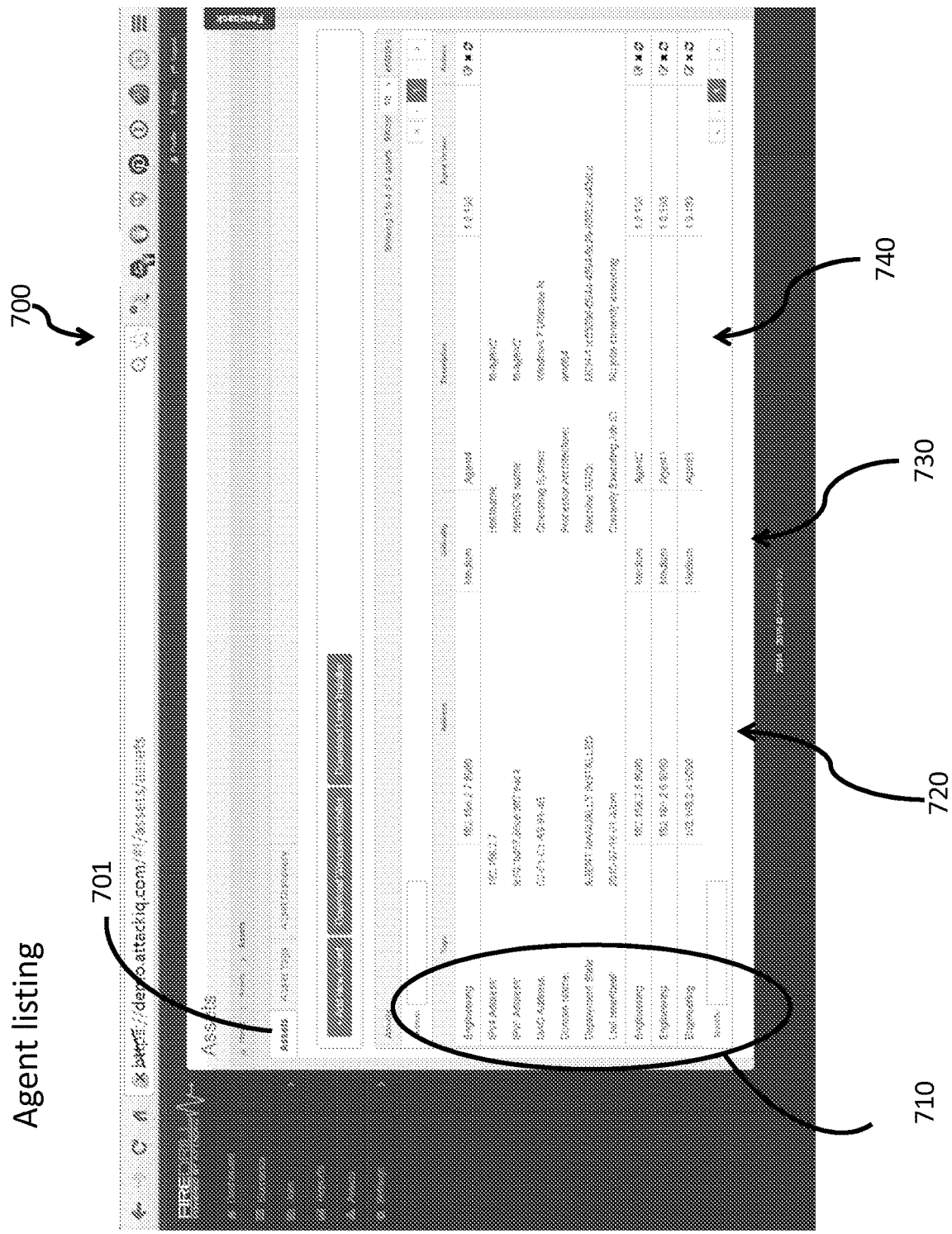
FIGS. 7-9 depict various features of the current subject matter.
Figure 8:
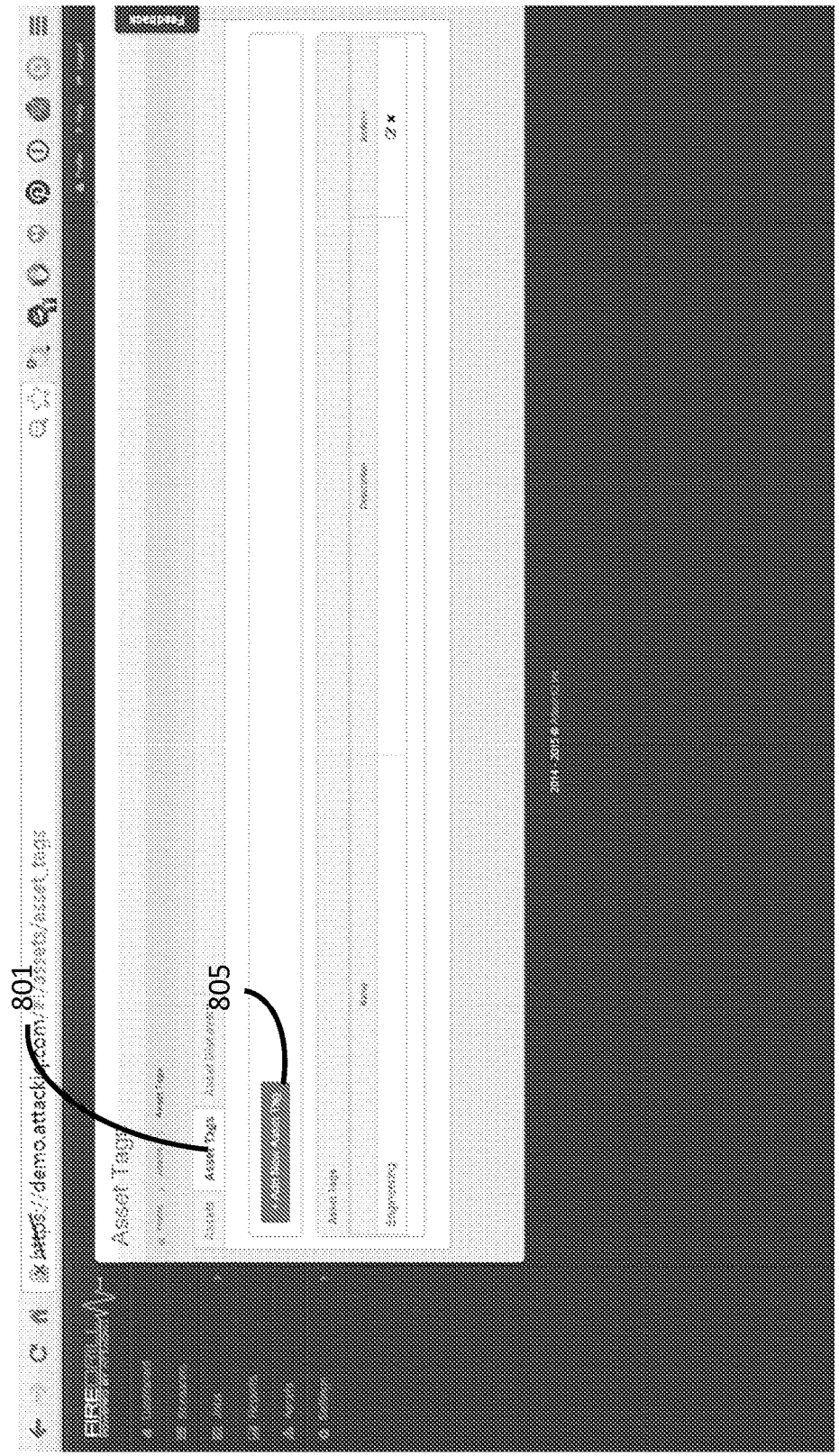
Figure 9:
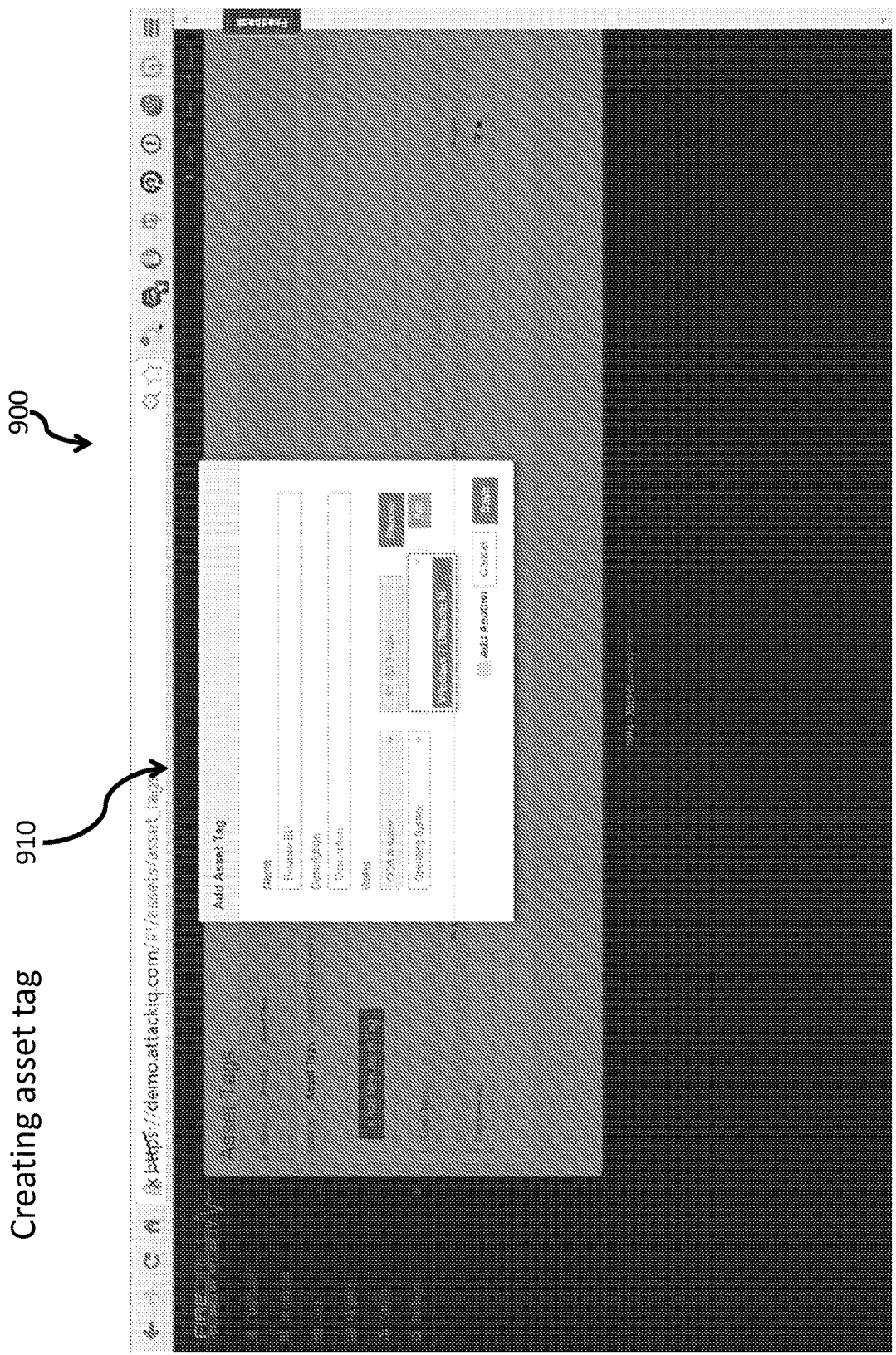

FIGS. 7-9 are examples of a user interface that allows one or more assets to be tagged to enable better management of the assets (for example, a group of related assets can be tagged together based on certain characteristics such as (for example) IP address). As shown in FIG. 7, user interface 700 includes a tab 701 that shows a listing of assets that have been tagged. The listing includes the tags 710 of the assets, the corresponding addresses 720, criticality 730, and description 740.

FIG. 8, in user interface 800, shows Asset Tags tab 801 that includes Add New Asset Tag feature 805, which when selected, leads to user interface 900 of FIG. 9, which provides a window 910 that allows a user to enter the name, description, and rule (as examples) of asset(s) to be tagged.

In some variations, each asset/agent on (or any asset/agent that is discovered) the network can be stored on the console (e.g., on an asset/agent database). This data can be, for example, provided to the console, or in some variations, the console can periodically look for and/or listen to new assets/agents. Information about the assets can include attributes of the device such as, for example, IP Address, MAC Address, operating system, processor type, machine type, etc. which can be reported to the console and used to identify and/or cluster/group the assets.

In some variations, the current subject matter can group targeted agents/assets in the network together based on one or more attributes of those agents/assets. This way, one or more scenarios can be sent to the targeted group(s) that matches the pre-defined attributes even if some other attributes can or may have been changed (for example, IP address may be change dynamically).

References will now be made to FIGS. 10-15, which depict a graphical user interface that allows a user to interact with the console and perform one or more features discussed herein.

Figure 10:
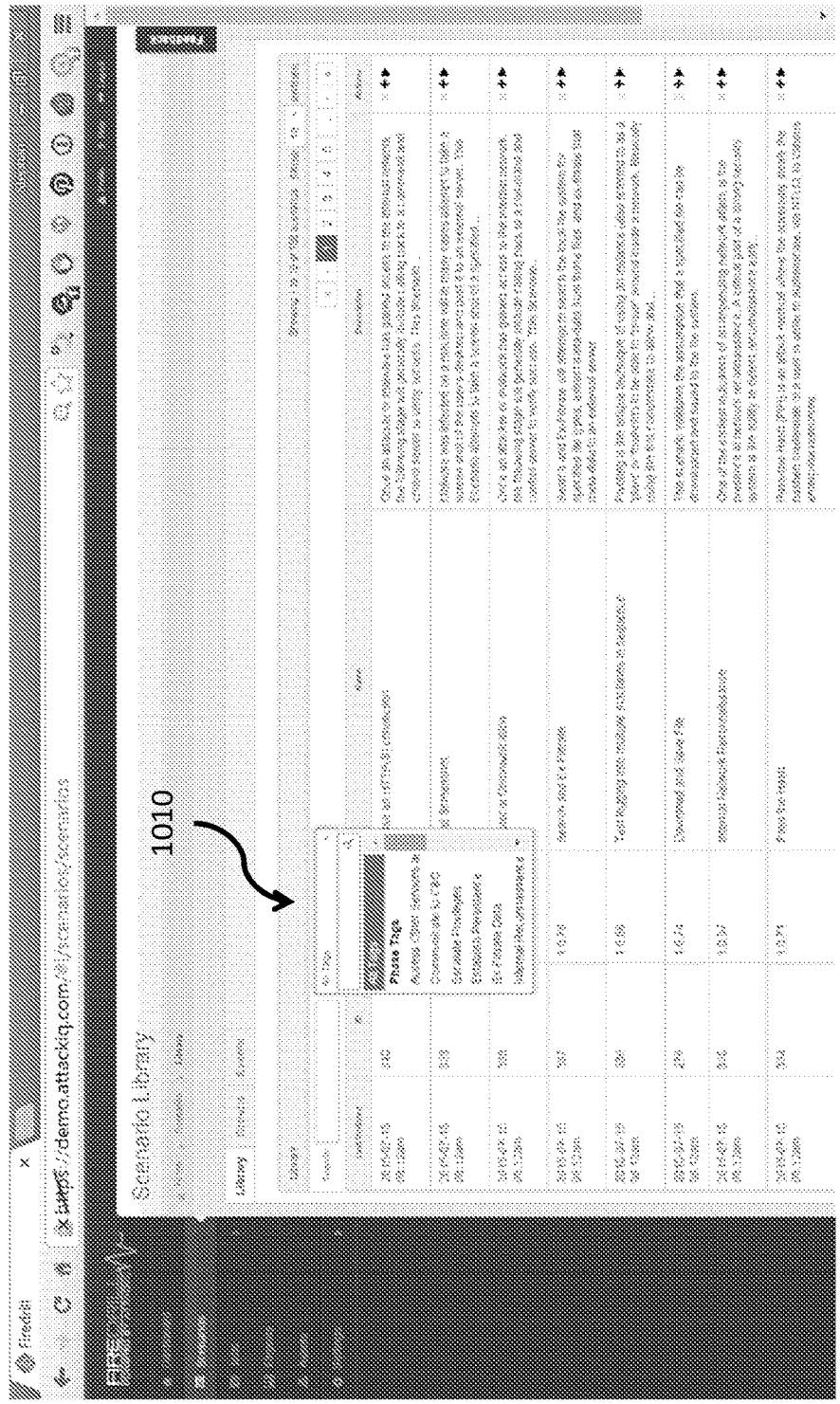
FIGS. 10-15 depict various additional features of the current subject matter.
Figure 11:
Figure 12:
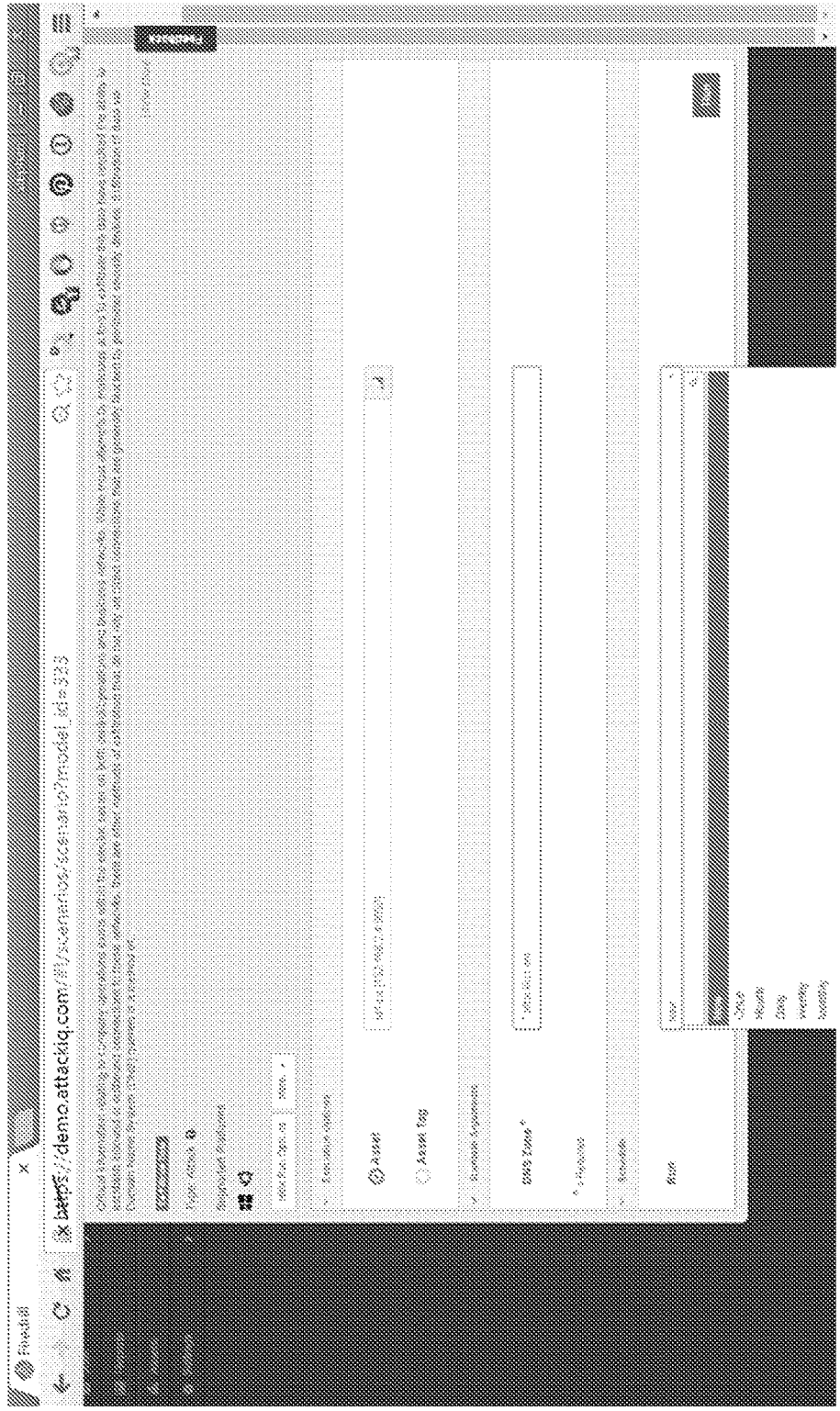

As shown in FIG. 10, using screen 1000, a user can access a scenario library containing a listing of scenarios that had been generated before. In this example, information regarding each scenario can be displayed (for example, last updated timestamp, ID, version, Name, Description, and Actions). The user can search for a particular scenario, or select a category of scenarios that the user is looking for using dropdown menu 1010.

Once a scenario is selected, the user can be provided with one or more options of the scenario to be selected and/or entered. For example, in FIG. 11, screen 1100 shows (as an example for illustration purposes) that the user has selected the "File Ex-Filtration over DNS" scenario. A brief description of that scenario is provided at the top of screen 1100, and a listing of options for user input is provided below the description. Here, at 1110, the user can input/select a particular asset (e.g., using IP address or hostname), or selecting the asset(s) via asset tag. This scenario also includes a scenario argument 1120 for user input. In this case, there is only one scenario argument (DNS Zone) but any number and types of arguments can be used (e.g., using one or more checkboxes, textboxes, conditional arguments, etc. and can be represented using, for example, buttons, drop down menus, etc.). This scenario also includes a scheduling option 1130 to allow the user to input when and/or frequency (e.g., now, once, hourly, daily, weekly, monthly, etc.) of the scenario to be run (See FIG. 12, screen 1200).

Figure 13:
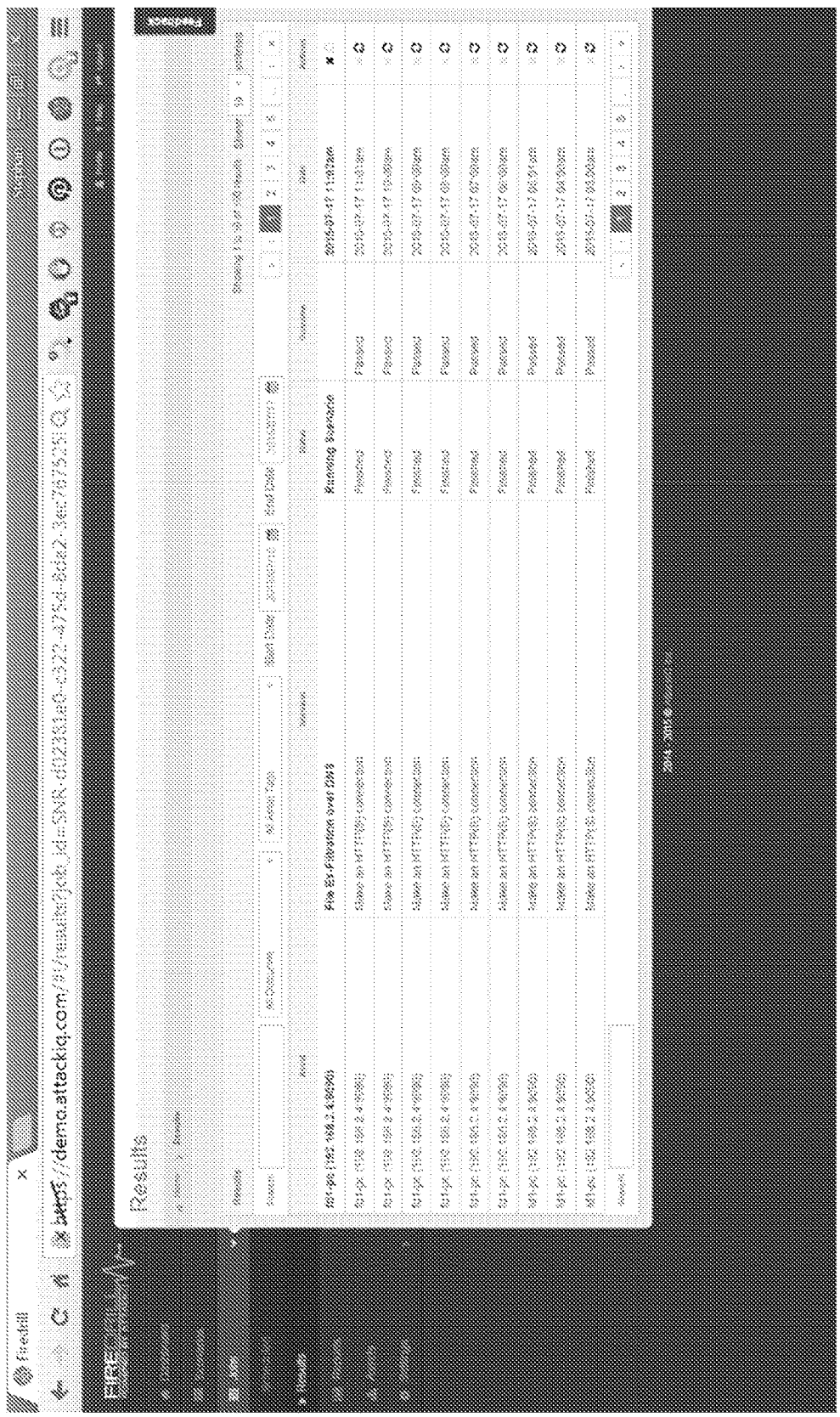

FIG. 13 shows screen 1300, which displays a listing of results of scenarios that had either been run, currently running, and/or scheduled to run. The listing can include information of the scenarios such as the asset on which the scenario ran, the scenario name, status, outcome, date, and actions. Under actions, the user has the option to stop a currently running (or scheduled) scenario (e.g., using the "x"). The user also has the option to repeat a scenario (e.g., using the loop icon).

Figure 14:
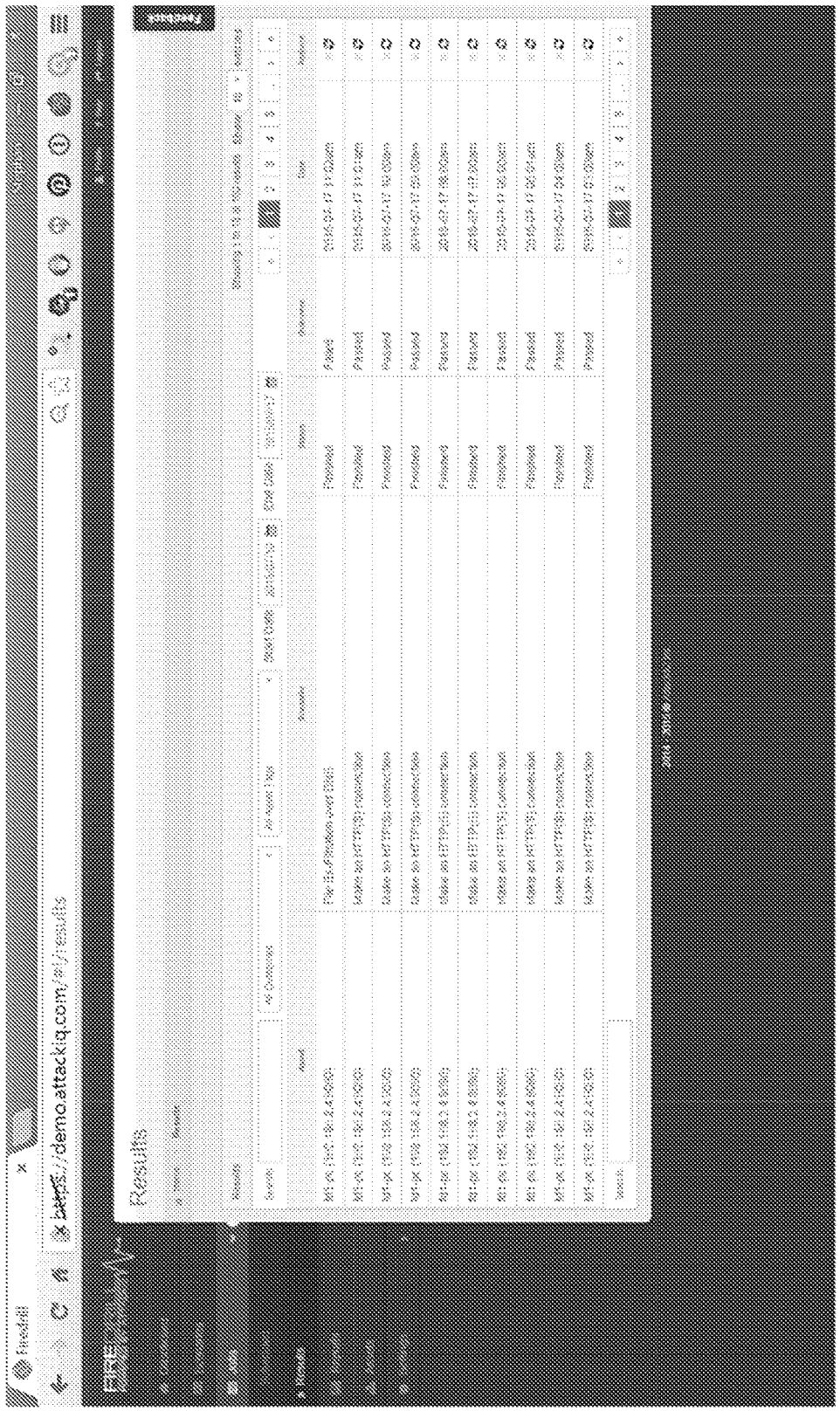
Figure 15:
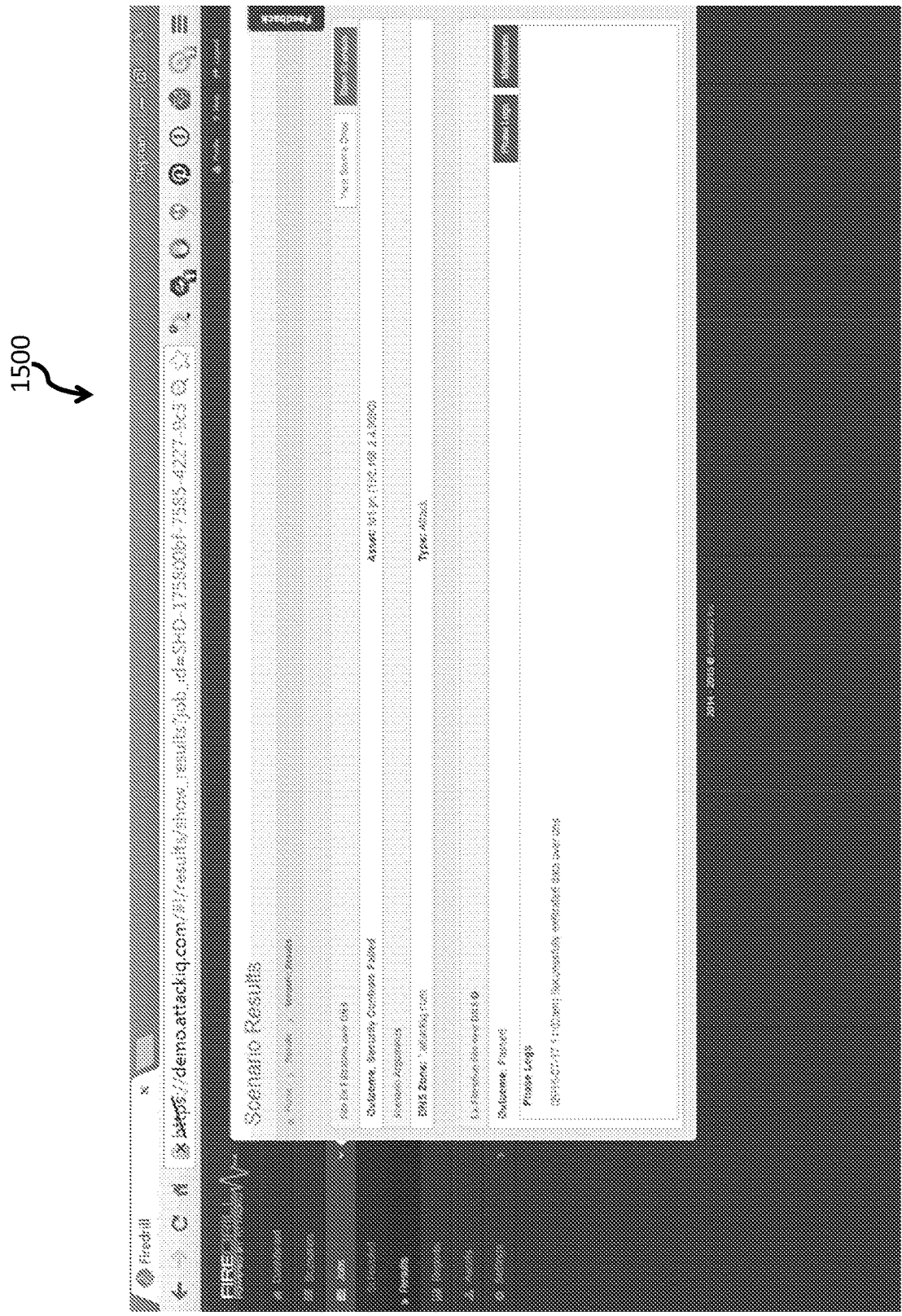

Screen 1400 of FIG. 14 is similar to screen 1300 except that here, the "File Ex-Filtration over DNS" scenario had finished running and failed. To see more information about the scenario, the user can click on the scenario. FIG. 15 shows an exemplary screen 1500 displaying a scenario that the user had selected (in this example, the user selected the "File Ex-Filtration over DNS" scenario that had failed). Here, the outcomes of previous scenario run are shown. In some variations, a scenario can be run multiple times and sometimes have an outcome of pass and sometimes have an outcome of fail (e.g., dependent on the factors of where it was run, the arguments, and the configuration at the time of execution), so a history/log of scenario runs can be helpful to diagnose and/or develop mitigation strategies.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claim(s).

What is claimed is:

1. A computer-implemented method for implementation by at least one data processor forming part of at least one computing system, the method comprising:
   receiving, by at least one data processor, data specifying a scenario, the scenario comprising a plurality of phases defining an execution path and at least a first asset and a second asset of a network on which to execute the plurality of phases wherein the plurality of phases include at least two of: Injection, Escalation, Hiding, Gaining Persistence, Lateral Movement, Command and Control, Exfiltration, and Cleanup;
   initiating deployment, by at least one data processor, of at least a first portion of the scenario to a first agent deployed at the first asset and a second portion of the scenario to a second agent deployed at the second asset wherein the first portion of the scenario includes first instructions informing the first agent that the first agent is to play a first part in the scenario by executing first code and wherein the second portion of the scenario includes second instructions informing the second agent that the second agent is to play a second part in the scenario by executing second code different from the first code, wherein the first agent communicates with at least one of the second agent and another asset of the network so as to perform an orchestrated attack or validation of the network involving the first agent and the second agent;
   receiving, from the first asset and the second asset, outcome data characterizing an outcome for each of the phases; and
   providing, by at least one data processor, the outcome data.

2. The computer-implemented method according to claim 1, wherein the providing comprises at least one of: storing the outcome data, loading the outcome data into memory, transmitting the outcome data to a remote computing system, or displaying the outcome data in a graphical user interface.

3. The computer-implemented method according to claim 1, wherein the data specifying the scenario comprising the plurality of phases and the execution path are generated to validate a device or network status in compliance with one or more predefined network integrity standards.

4. The computer-implemented method according to claim 1, wherein the data specifying the scenario comprising the plurality of phases and the execution path are generated to mimic an attack of the network by a third party via the first asset and the second asset.

5. The computer-implemented method according to claim 4, further comprising:
   collecting, by at least one data processor, attack intelligence data representing the mimicked attack, wherein the attack intelligence data comprises one or more indicators of attack of the mimicked attack;
   generating, by at least one data processor, an attack intelligence element based on one or more elements collected from the attack intelligence data;
   wherein the execution path of the phases are generated based on the attack intelligence element.

6. The computer-implemented method according to claim 4, further comprising:
   collecting, by at least one data processor, attack intelligence data representing the mimicked attack;
   analyzing, by at least one data processor, the attack intelligence data to determine whether the mimicked attack is destructive.

7. The computer-implemented method according to claim 1, further comprising deploying, by at least one data processor, at least a portion of the scenario to a further asset of the network; wherein the execution path of the phases includes a coordination of the first asset, the second asset and the further asset.

8. The computer-implemented method according to claim 1, wherein the at least the first portion of the scenario is stored in a local cache of the first asset, wherein the execution of at least the first portion of the scenario by the first asset is executed from the local cache.

9. The computer-implemented method according to claim 8, wherein the first portion of the scenario stored on the local cache is encrypted.

10. The method according to claim 1, wherein the scenario further comprises at least one parameter controlling the execution of at least one of the plurality of phases.

11. The method according to claim 1, further comprising initiating, by at least one data processor, execution of at least the first portion of the scenario by the first asset.

12. A system comprising:
at least one data processor; and
memory storing instructions which, when executed by the at least one data processor, implement a method comprising:
receiving data specifying a scenario, the scenario comprising a plurality of phases defining an execution path and at least a first asset and a second asset of a network on which to execute the plurality of phases wherein the plurality of phases include at least two of: Injection, Escalation, Hiding, Gaining Persistence, Lateral Movement, Command and Control, Exfiltration, and Cleanup;
initiating deployment of at least a first portion of the scenario to a first agent deployed at the first asset and a second portion of the scenario to a second agent deployed at the second asset wherein the first portion of the scenario includes first instructions informing the first agent that the first agent is to play a first part in the scenario by executing first code and wherein the second portion of the scenario includes second instructions informing the second agent that the second agent is to play a second part in the scenario by executing second code different from the first code, wherein the first agent communicates with at least one of the second agent and another asset of the network so as to perform an orchestrated attack or validation of the network involving the first agent and the second agent;
receiving, from the first asset and the second asset, outcome data characterizing an outcome for each of the phases; and
providing the outcome data.

13. The system according to claim 12, wherein the providing comprises at least one of: storing the outcome data, loading the outcome data into memory, transmitting the outcome data to a remote computing system, or displaying the outcome data in a graphical user interface.

14. The system according to claim 12, wherein the data specifying the scenario comprising the plurality of phases and the execution path are generated to validate a device or network status in compliance with one or more predefined network integrity standards.

15. The system according to claim 12, wherein the data specifying the scenario comprising the plurality of phases and the execution path are generated to mimic an attack of the network by a third party via the selected at least one first asset and the second asset.

16. The system according to claim 15, further comprising:
collecting attack intelligence data representing the mimicked attack, wherein the attack intelligence data comprises one or more indicators of attack of the mimicked attack;
generating an attack intelligence element based on one or more elements collected from the attack intelligence data;
wherein the execution path of the phases are generated based on the attack intelligence element.

\* \* \* \* \*